US006023019A

United States Patent [19]

Baggs

[11] Patent Number: 6,023,019

[45] Date of Patent: Feb. 8, 2000

[54] FLEXIBLE PICKUP CIRCUIT ASSEMBLY FOR STRINGED INSTRUMENTS

[76] Inventor: Lloyd R. Baggs, 210 El Cerrito Dr., Nipomo, Calif. 93444

[21] Appl. No.: 08/947,561

[22] Filed: Oct. 9, 1997

Related U.S. Application Data

[62] Division of application No. 08/559,930, Nov. 17, 1995, Pat. No. 5,866,835, which is a continuation of application No. 08/209,979, Mar. 11, 1994, abandoned.

[51] Int. Cl.[7] .......... G01H 3/18

[52] U.S. Cl. .......... 84/731; 84/DIG. 24

[58] Field of Search .......... 84/730, 731, 743, 84/DIG. 24

[56] References Cited

U.S. PATENT DOCUMENTS

| | | | |
|---|---|---|---|
| 4,314,495 | 2/1982 | Baggs | 84/1.16 |
| 4,378,721 | 4/1983 | Kaneko et al. . | |
| 4,491,051 | 1/1985 | Barcus | 84/1.16 |
| 4,657,114 | 4/1987 | Shaw | 84/1.16 |
| 4,911,057 | 3/1990 | Fishman | 84/731 |
| 4,944,209 | 7/1990 | Fishman | 84/731 |
| 4,989,491 | 2/1991 | Baggs | 84/723 |
| 5,025,704 | 6/1991 | Davis | 84/723 |
| 5,029,375 | 7/1991 | Fishman | 29/29.35 |
| 5,109,747 | 5/1992 | Spuler | 84/731 |
| 5,123,325 | 6/1992 | Turner | 84/731 |
| 5,153,363 | 10/1992 | Fishman et al. | 84/731 |
| 5,155,285 | 10/1992 | Fishman | 84/731 |
| 5,189,771 | 3/1993 | Fishman | 29/25.35 |
| 5,204,481 | 4/1993 | Turner | 84/731 |
| 5,319,153 | 6/1994 | Fishman | 84/731 |
| 5,410,101 | 4/1995 | Sakurai | 84/731 |
| 5,670,733 | 9/1997 | Fishman . | |

OTHER PUBLICATIONS

Bulletin FC–301, "Flex–Circuits," Minco Products, Inc., Minneapolis, Minnesota, Copyright 1988.

*Primary Examiner*—Jeffrey W. Donels
*Attorney, Agent, or Firm*—Christie, Parker & Hale, LLP

[57] ABSTRACT

In a stringed instrument, such as a guitar including a saddle for holding the strings and a pickup assembly for converting vibrations of the strings into electrical signals, the saddle has a curved bottom surface for contacting the pickup assembly. The pickup assembly is formed in flexible layers, including a first layer of insulation, a second layer of piezoelectric film with a ground lead on top, a third layer having contacts formed thereon in positions corresponding to the strings to create active areas in the film underneath the strings, the third layer having lead lines disposed at the bottom thereof, and additional lead lines at the bottom of a fourth flexible layer. Electrodes communicate one end of the lead lines with the contacts via through-holes in the intervening layers. The other ends of the lead lines fasten to pins which connect to an amplifier circuit. The amplifier circuit can be combined with a wireless FM transmitter. The pickup is easy to manufacture in a wide variety of widths simply by changing the position of die cutting blades used in the manufacturing process.

124 Claims, 9 Drawing Sheets

Fig. 1
PRIOR ART
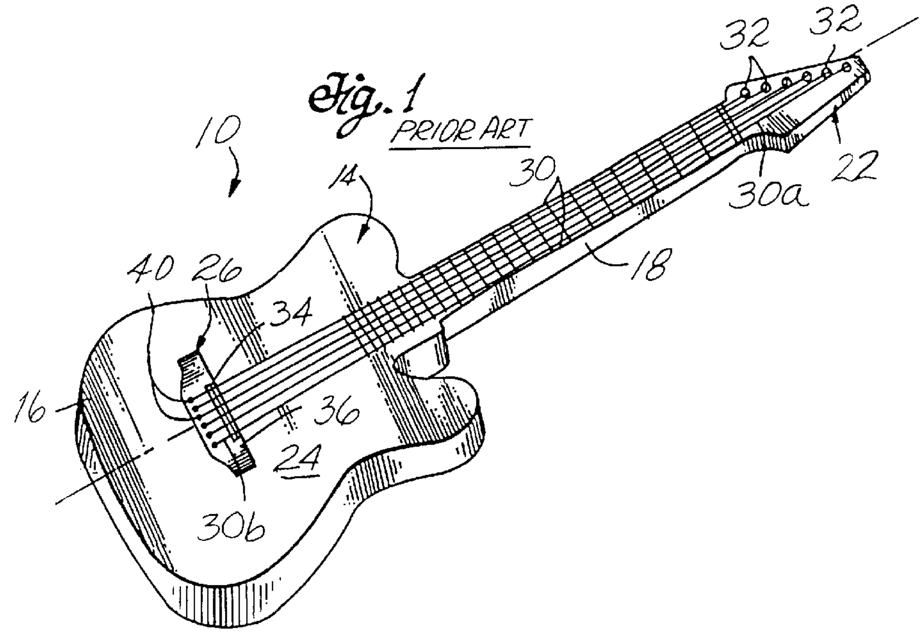
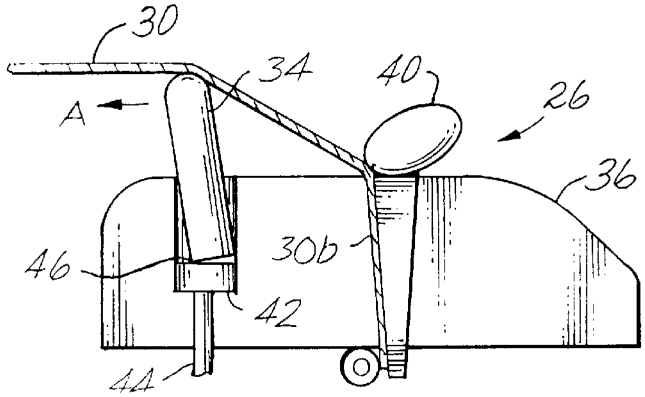
Fig. 2
PRIOR ART
Fig. 3
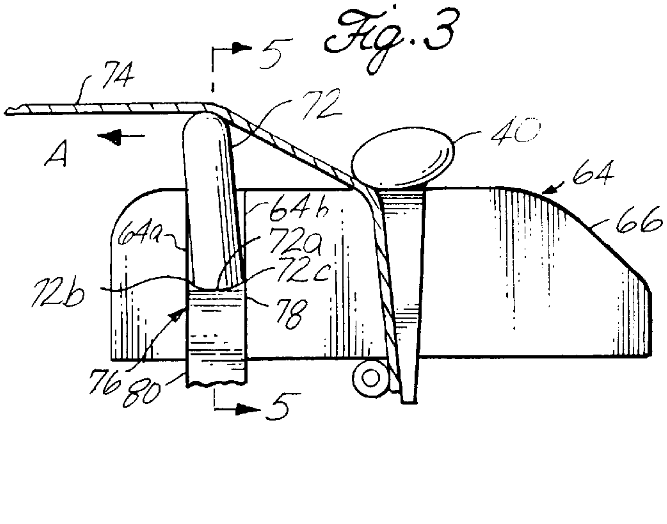

Fig. 4
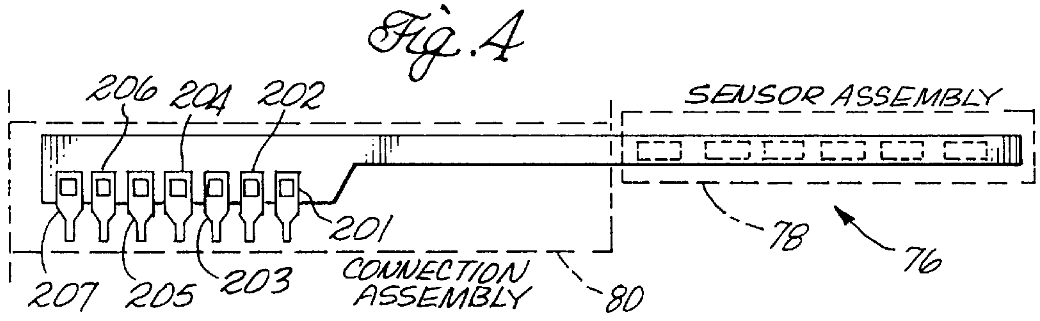
Fig. 5
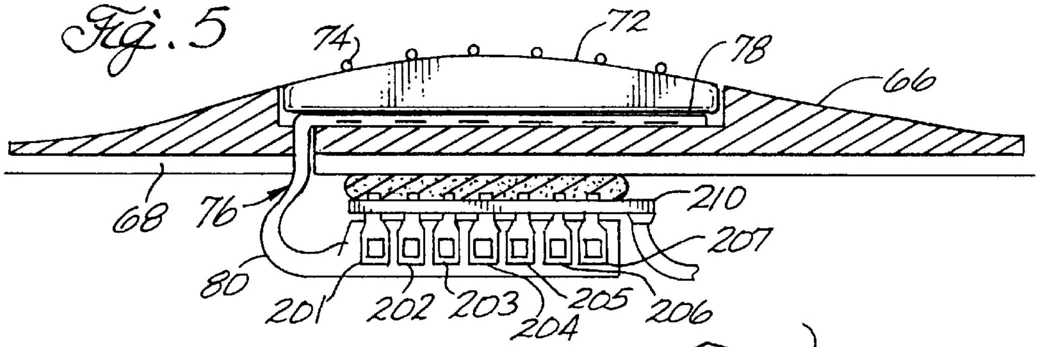
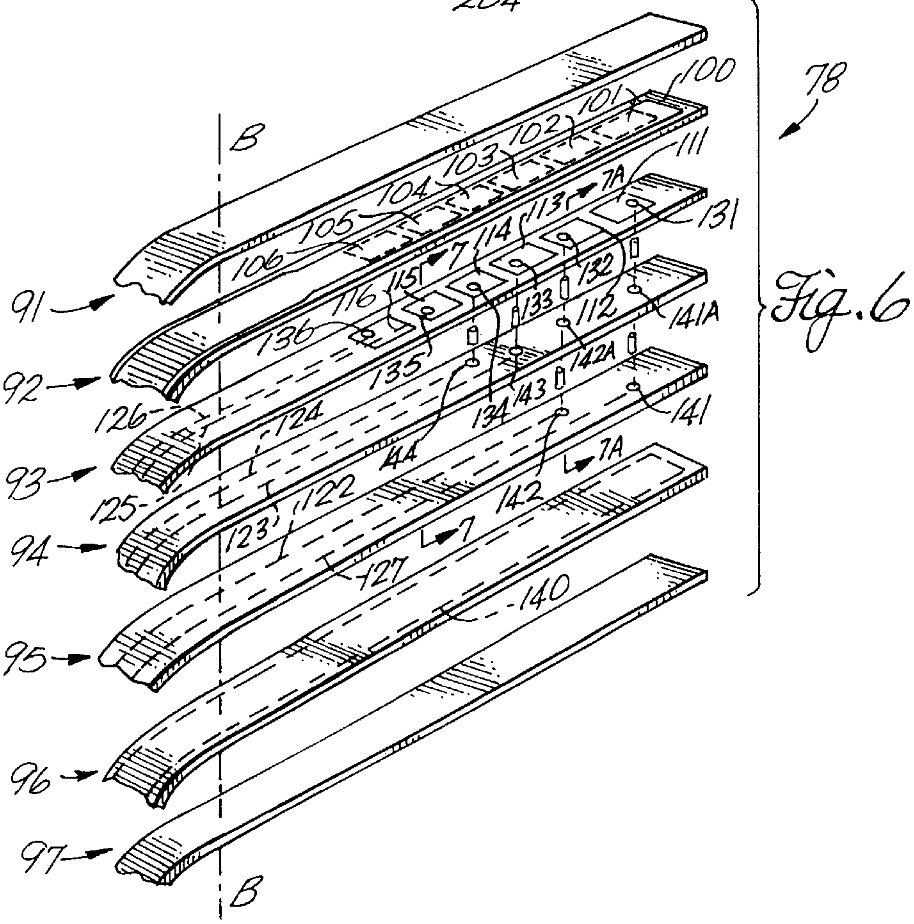
Fig. 6

Fig. 7
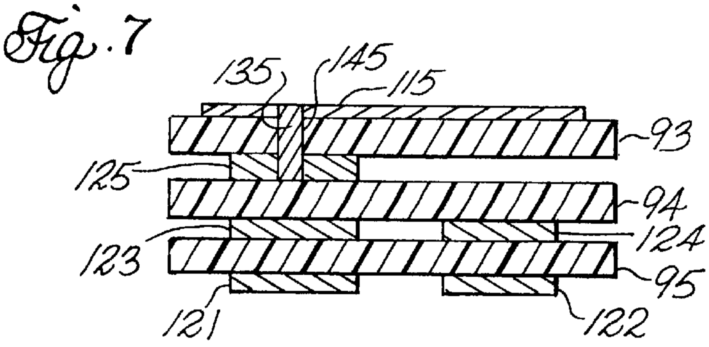
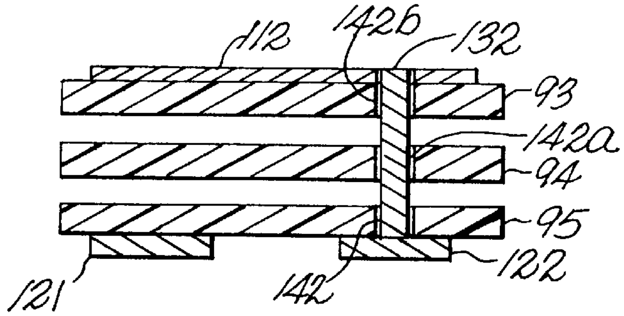
Fig. 7A
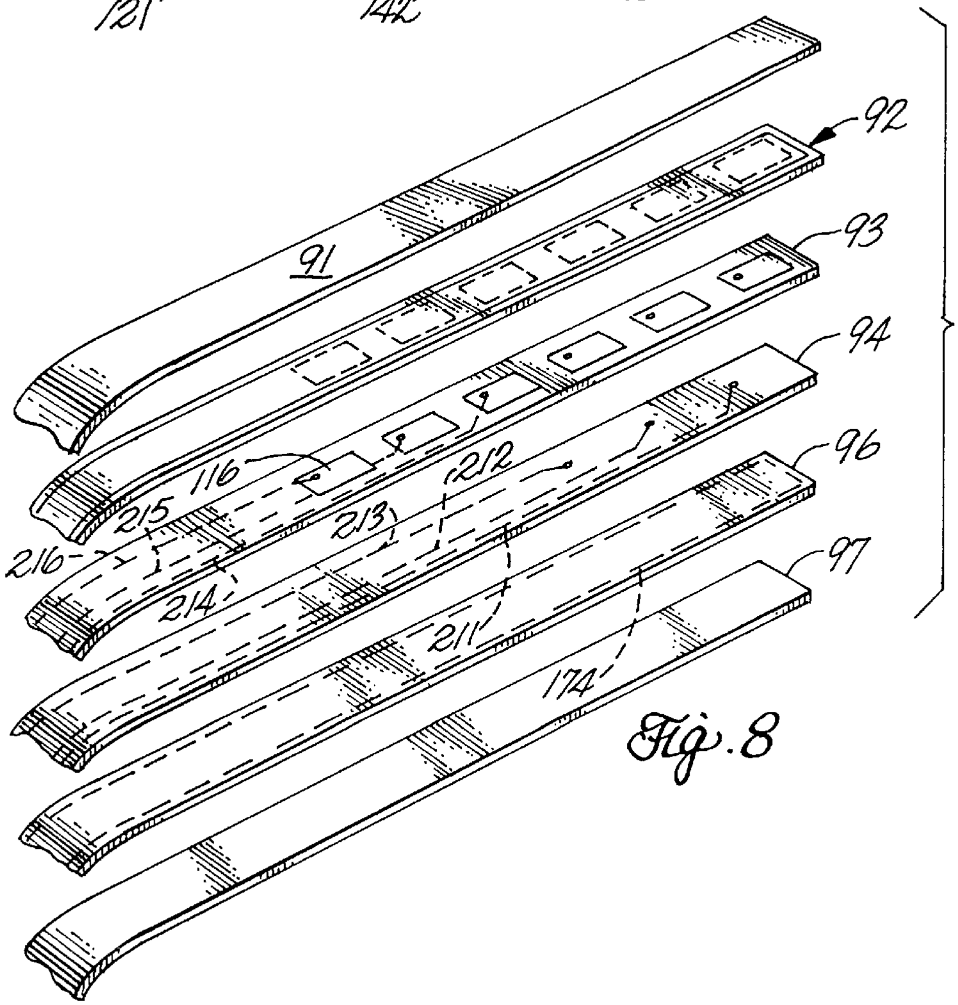
Fig. 8

FLEXIBLE PICKUP CIRCUIT ASSEMBLY FOR STRINGED INSTRUMENTS

CROSS-REFERENCE TO RELATED APPLICATION

This is a division of patent application Ser. No. 08/559,930 filed Nov. 17, 1995, now U.S. Pat. No. 5,866,835, which is a continuation of application Ser. No. 08/209,979, filed Mar. 11, 1994, now abandoned.

FIELD OF THE INVENTION

The present invention relates to an undersaddle pickup for stringed instruments and, in particular, to an undersaddle flexible pickup circuit and also to a curved-bottom of a saddle for contacting the pickup circuit.

BACKGROUND OF THE INVENTION

Pickups have been used for a long time as transducers for converting musical sounds, i.e., the vibrations of strings of a musical instrument, into electrical signals in order to process the signals and reproduce the sounds in an amplified form. Such pickups, which often incorporate rigid piezoelectric crystals to convert vibrations into electrical signals, are mounted under the saddle of a stringed instrument. The crystals are sandwiched between a reference voltage and contacts. Leads connect to the contacts, and wires are connected to each of the leads at one end and to an amplifier at the other end.

By way of example, a typical guitar 10 is shown in FIG. 1. The guitar has a front side 14, a body 16, a neck 18 attached to the body, and a standard tuning mechanism 22 at a free end of the neck. The front side 14 has a sound board 24 with a bridge assembly 26 mounted on it. There are six strings 30 extending from distal ends 30*a* connected to tuning posts 32, over a saddle assembly 34 and into a bridge plate 36 at their proximal ends 30*b* which are also fastened by posts 40.

FIG. 2 shows a semi-schematic enlarged end view, in partial cross section, of a bridge assembly 26. For each string 30, pressure from the normal mounting of the string pulls saddle 34 forward (in the direction of arrow A) and down so that the saddle sits in the tilted position as shown. When the string is plucked or otherwise played, the string's vibrations are transferred to the saddle. The vibratory movement of the saddle is transferred to a transducer or pickup 42, which underlies and is in contact with the saddle. The pickup incorporates a piezoelectric element, which converts the vibratory motion of the saddle into an electrical signal which is carried by pickup wires 44 to an amplifier (not shown). The signal is then processed, as is well known in the art, to reproduce the string's sound at speakers.

An example of a pickup incorporating piezoelectric crystals is shown in U.S. Pat. No. 4,657,114 to Shaw, which is directed to a combination saddle and pickup. In the pickup, six piezoelectric crystals are held in spaced relation by a rigid frame. On top of the crystals is a common (ground) conductor connected to an upper face of each crystal. The lower face of each crystal is pressed against a conductor so that an electrical signal is generated by each of the crystals is response to the vibrations transferred from the saddle. The signals pass from the crystals to six contact elements, respectively, located below the conductor and in registry with the crystals. The contact elements sit on a PC board, which has leads on it for each contact element, which leads carry the sensed voltages to wires which bend and pass through a hole in the bridge plate and the guitar top to the inside of the guitar where they connect to an amplifier jack.

In such a pickup, the frame and PC board create rigid and thick structure, which i,s conventionally used to provide support for the elements, and to electrically shield the leads, among other reasons. Due to this rigid structure, the wires are necessary for flexibility in order to be bent as needed to pass from the undersaddle portion of the pickup into the guitar body and to connect the leads to the amplifier jack.

The wires are normally soldered to the leads. The solder joints are cumbersome to make and can often come apart with very little tension on the wires or leads, e.g., due to any movements of the pickup or wires. Once such a connection breaks, it is virtually impossible to repair, and a new pickup is required. The problem of loose connections of the leads to the wires has plagued amplified acoustic guitars and other stringed instruments for quite some time. The problem is particularly acute where the pickup is multiphonic, that is, where the pickup has separate contacts and leads for each string. In a six-stringed guitar, connecting six wires to six leads is quite cumbersome. Often, as in U.S. Pat. No. 5,123,325 to Turner, coaxial cables or multiple axial cables are connected to the leads to minimize the number of wires used and to provide some shielding of the signals in the wires from each other. Still, interconnection of the leads with the wires is cumbersome, and the strength of the connection is weak.

The lead connection problem also exists in undersaddle pickups, which are separately manufactured from the saddle as opposed to Shaw's combined saddle and pickup.

Another problem with undersaddle pickups is that the relatively thick structure of a typical undersaddle pickup requires that when retrofitting a guitar with a pickup, the saddle must be replaced or cut so that the new or modified saddle is at the same height when sitting on the pickup as the old saddle was without the pickup.

A further problem with a conventional undersaddle pickup assembly arises from the fact that, due to the static pressure of the string, i.e., the pressure at which the string is strung, the saddle is tilted. This tilt results in only a line-type contact between the saddle and pickup 42 at front edge 46 of the saddle. The saddle typically will be tilted about 2° under maximum string pressure, but this could be up to about 3° to 5°, or even 10°, in some instruments. The amount of tilt can be reduced by more snugly installing the saddle in the bridge, but this too severely impedes translation of vibrations from the strings to the transducer. Therefore, guitar manufacturers typically provide 0.004" to 0.008" of total play between the saddle and bridge walls of amplified acoustic instruments to accommodate shrinking and swelling of the bridge slot due to ambient temperature and humidity to ensure that the saddle can freely move up and down to transfer the strings' static load evenly to the pickup.

The problem which results from the tilted saddle is that the line-type contact, e.g., at front edge 46, is often near the front edge of the pickup. This means that the line of contact may be at the edge or beyond the edge of the piezoelectric elements which are not normally as wide as the pickup, because the pickup's housing and insulation is provided on each side of the piezoelectric elements. Thus, there is a very limited contact area between the saddle and pickup due to the tilted saddle, and there is the possibility that the saddle contact line will be outside or at the very edge of the piezoelectric elements. This results in poor translation of the saddle's static pressure to the piezoelectric elements for any elements with which the line of contact is not in registry.

More importantly, where there are multiple elements in the pickup, there will inevitably be some misalignment between piezoelectric elements due to manufacturing tolerances. Accordingly, some elements will be in registry with the line of contact, and some will not. The resultant problem is that the static load on each crystal will be different, depending upon whether it is underneath or not underneath the line of contact.

Because the output level of the electric signal from a piezoelectric material varies with the static load on the material, the uneven pressure will create uneven string balance in the signal output from each element. Furthermore, the line-type contact of the saddle with the pickup results in high pressure on the pickup due to the small area of contact, which can shatter or damage the piezoelectric element when this contact is near the edge of the element, particularly where the element is circular. Therefore, it is desirable to make the static load on each crystal consistent.

The aforementioned problem of too snugly installing the saddle also impedes the even translation of the strings' static load to the pickup.

A further problem is that pickup assemblies are relatively thick and spongy due to use of a skeletal structure, substantial foil or shielding means, solid piezocrystal or PVDF film, and thus they will absorb and damp some of the strings' available energy that would otherwise be transmitted to the guitar body. For example, in U.S. Pat. No. 5,155,285 to Fishman, an undersaddle pickup, in one embodiment, is formed by a circuit board having fiberglass and copper clad layers, a carbon fiber strip below the circuit board, a piezoelectric (PVDF) sheet, a metal sheet as a ground plane, and an outer shield of paper and paint wrapping. The paper and paint wrapping give the structure a spongy quality, even though the circuit board and metal sheet are rigid. Since it is desirable for the guitar body to receive as much of the strings' vibrations as possible to enhance the volume and quality of the guitar's acoustic output, the absorption and dampening of the vibrational energy transfer by such a thick, spongy pickup will adversely affect the guitar's acoustic output.

An additional problem with undersaddle pickups is fitting the pickup to the instrument's saddle (or bridge slot) thickness, since the saddle thickness varies depending upon the instrument. For example, in acoustic guitars saddle thicknesses of 0.093, 0.110, 0.125, and 0.187 inch exist with 0.093 and 0.125 inch being the most common in the Unites States. Currently, undersaddle pickups come in two very different models to accommodate the two common slot sizes. The different models require different equipment and assembly lines to manufacture. Moreover, fitting the non-common slot sizes with an undersaddle pickup requires substantial work on the saddle slot, or a custom undersaddle pickup. Rather than undertake these measures, often one simply uses one of the two standard size pickups, e.g., the pickup for an 0.093 inch thick saddle with a 0.110 inch saddle or the pickup for a 0.125 saddle with a 0.187 inch saddle. This leaves so much play between the pickup and the bridge slot walls that it is difficult to reliably position the pickup such that the forward edge 46 of the saddle 34 will contact the pickup at or near the centerline for the pickup. This exacerbates the line contact problem discussed above.

In view of the foregoing, what is needed is an undersaddle pickup which is thin so as to minimize the adverse affect on the acoustics of the instrument, and which does not suffer from the assembly problem of connecting leads to wires and from the attendant problems of an unreliable connection of the wires with the leads, and bulkiness of the wires. These problems are particularly acute where hexaphonic pickups are used because there are six leads. What is also needed is a pickup and saddle assembly in which the static pressure on each piezoelectric element is consistent. What is further needed is a pickup that once it is installed, the string-to-string volume may be easily adjusted by external electronic controls for the following purposes: (1) to compensate for the often imperfect craftsmanship found in production guitars and in aftermarket installations; (2) to adjust for changes to the guitar's structure due to changes in ambient temperature and humidity; and (3) to suit the individual musician's artistic taste. What is further needed is an undersaddle pickup that is easy and inexpensive to manufacture in numerous sizes.

SUMMARY OF THE INVENTION

The present invention is directed to a pickup which underlies a saddle in a stringed instrument, which pickup is relatively thin, flexible, and eliminates the need for cumbersome, bulky, and unreliable wire connections. The invention is also directed to a pickup which is easy and inexpensive to manufacture in numerous sizes, and a method of manufacturing such a pickup. In a preferred embodiment, the saddle employed with this pickup is configured to enhance the reproducibility of sound and string-to-string balance developed by the interaction between the strings, the saddle, the underlying pickup, and guitar body.

In one embodiment, the present invention includes a pickup having a flexible piezoelectric strip for converting vibrations of a stringed instrument's saddle into electrical signals. Printed contacts and leads are provided for receiving the electrical signals and carrying them from the piezoelectric strip to an amplifier of the instrument. Flexible insulating substrates are provided for supporting the leads, and contacts and for allowing the pickup, including the leads, to be bent and passed through a bridge plate and through a guitar top into its body, where the leads connect to a pin header array. The array plugs into an amplifier or pre-amp.

In another embodiment, there is a single contact for receiving the electrical signals at the piezoelectric strip for all of the strings.

In an additional embodiment, the saddle includes a convexly curved bottom (about a longitudinal axis extending the length of the saddle and perpendicular to the strings) for contacting the pickup to ensure that the contact is in registry with piezoelectric elements within the pickup so as to provide consistent pressure on each piezoelectric element and thus provide enhanced string-to-string balance.

In a further embodiment, an FM transmitter is built into the input amplifier board which is located inside the instrument body and transmitting the signal to a remote receiver for subsequent processing.

In a still further embodiment of the invention, a process of manufacturing the pickup includes forming the substrates as sheets with multiple pickup circuits thereon and cutting the sheets at selected positions between the circuits to create individual pickups of any desired width.

BRIEF DESCRIPTION OF THE DRAWINGS

These and other features, aspects, and advantages of the present invention will be more fully understood when considered with respect to the following detailed description, appended claims, and accompanying drawings, wherein:

The invention will be described in more detail below, with reference to the drawings in which:

FIG. 1 is a front perspective view of a conventional guitar suitable for use with the invention;

FIG. 2 is a semi-schematic end view of a bridge assembly of the guitar of FIG. 1 showing a conventional saddle and pickup assembly with the saddle in a tilted position due to string pressure;

FIG. 3 is a semi-schematic end view of a bridge assembly similar to that of FIG. 2, but showing a saddle and pickup assembly according to an embodiment of the invention;

FIG. 4 a semi-schematic plan view of the pickup assembly used in FIG. 3 showing the assembly in stretched-out form;

FIG. 5 is a semi-schematic vertical sectional view of the bridge assembly of FIG. 3 taken along a line 5—5 and showing a guitar top and the pickup assembly connected to an amplifier with the assembly installed in a folded position;

FIG. 6 is a semi-schematic exploded perspective view of an undersaddle sensor assembly of the pickup assembly of FIG. 3;

FIGS. 7 and 7A are each semi-schematic vertical sectional views taken along lines 7—7 and 7A—7A, respectively, to show the middle three layers of the sensor assembly of FIG. 6;

FIG. 8 is a view similar to FIG. 6, but of an alternate embodiment of the sensor assembly;

DETAILED DESCRIPTION

Figure 8A:
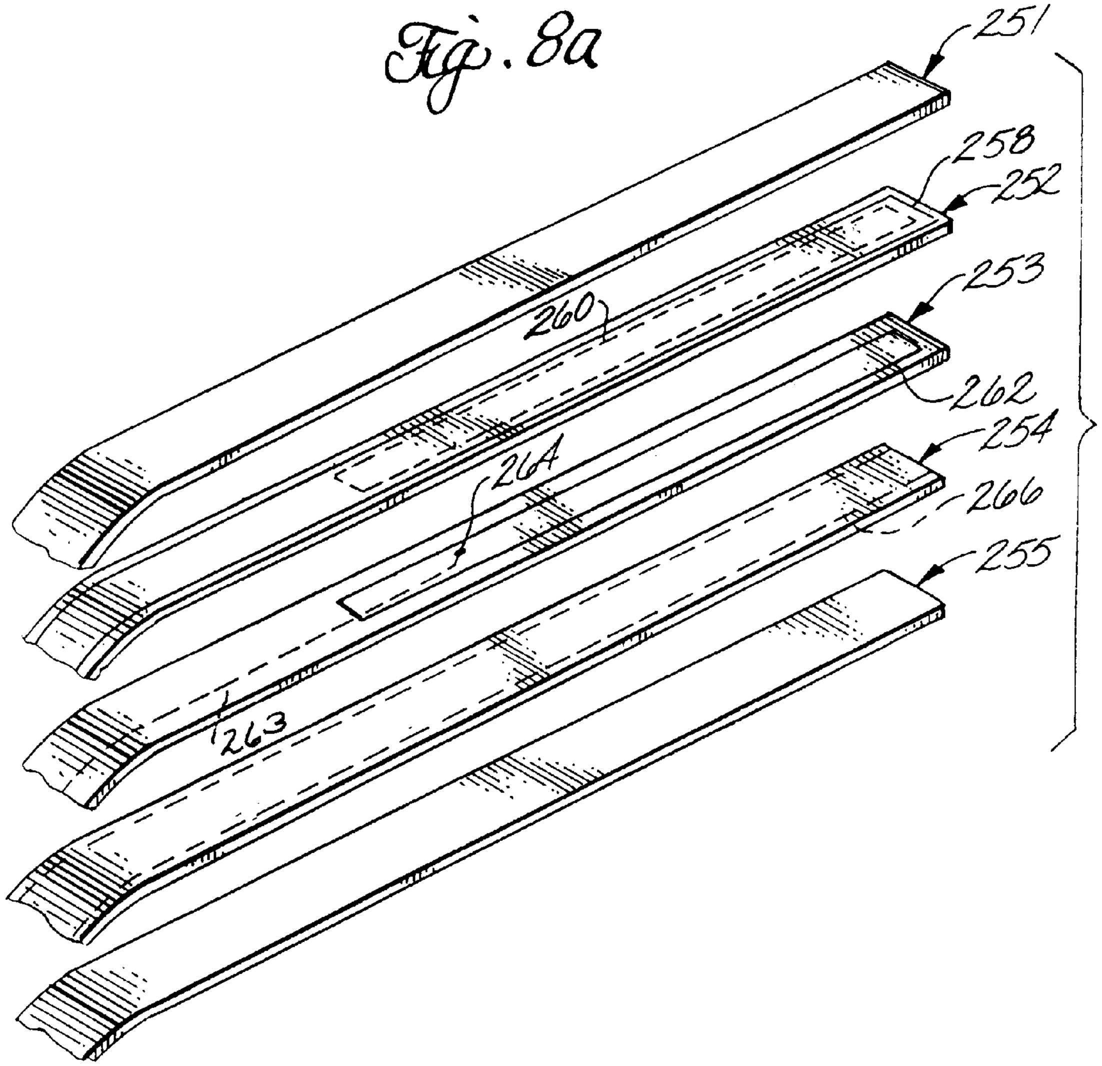
FIG. 8A is a view similar to FIG. 6, but of another alternate embodiment of the sensor assembly.

In accordance with one aspect of the invention, an undersaddle pickup assembly in a stringed instrument is formed using flexible circuit technology so that the entire pickup assembly can bend and thus pass from its undersaddle position to inside a guitar body without the need for wires. In addition, the leads terminate at a pin header array which can directly connect to an amplifier, and thus further avoiding the need to connect pickup wires to the leads.

Referring now to the drawings, and in particular to FIGS. 3 and 5, a bridge assembly 64 for a stringed instrument includes a bridge plate 66 mounted on a guitar top 68, a saddle 72 for supporting strings 74 and a pickup assembly 76. The pickup assembly is formed by a sensor assembly 78 underlying the saddle, and a connection portion 80 connected to the sensor assembly. The bridge plate 66, guitar top, and strings 74 are conventional.

The entire pickup assembly 76 is shown in a stretched-out form in FIG. 4 and in its folded form as it would be installed in a guitar in FIG. 5. The connection portion 80 in FIG. 5 is bent so that it can pass through the bridge plate 66 and guitar top 68 and connect to an amplifier inside the guitar.

In FIGS. 6 and 7, the sensor assembly 78 is shown broken into its component parts. In order to achieve flexibility, while avoiding the need for wires, the sensor assembly 78 and connection portion 80 incorporate a flexible circuit with circuit elements formed on multiple flexible substrates or strips designated 91–97, respectively, which are sandwiched together. The strips 91 and 93–97 are preferably made of a good insulating substrate, such as polyimide film, e.g., KAPTON™ (a polyimide strip typically of 1–5 mils thick made by E.I. Dupont de Nemours & Co.). The top substrate or first layer 91 is simply an insulator which contacts the saddle bottom. The second layer 92 forms a top electrical shielding layer which has a lead line 100 printed on it which is connected to ground, and the layer 92 itself is formed of a piezoelectric material, such as PVDF (polyvinyldenef luoride) film. The piezoelectric film may be said to have six active areas 101–106 which are defined by each of six contact areas 111–116, which are printed on top of the third layer 93 in positions corresponding to the six strings 74. The contact areas sense the voltage across the piezoelectric film at the active areas, which are simply the portions of the film in registry with the contact areas. Preferably, the contact areas are of copper, but could be made of other suitable conductors.

The third through fifth layers 93 to 95 have first through sixth lead lines 121–126 printed on their undersides, which leads are connected to the contacts by first through sixth electrodes 131–136, respectively. In particular, layered on the bottom of the third layer 93 are the fifth and sixth lead lines 125 and 126 which electrically connect with the fifth and sixth contact areas 115, 116 by means of the fifth and sixth electrodes 135, 136 passing through layer 93. It would be preferable to put lead lines for all of the contact areas on the bottom of the third layer 93, but the width of the substrate may not provide sufficient separation between so many leads. Accordingly, the fourth layer 94 has the third and fourth leads 123, 124 printed on the bottom thereof which leads communicate with the third and fourth contact areas 113, 114 via the third and fourth electrodes 133, 134 passing through the third and fourth layers 93, 94. In addition, the fifth layer 95 has the first and second leads, 121, 122 printed on its bottom for communicating with the first and second contact areas 111, 112 by means of the first and second electrodes 131, 132 passing through the third through fifth layers 93, 94, 95. The sixth layer 96 forms a bottom electrical shielding layer which has a lead line 140,printed on its bottom, which lead is connected to ground. The seventh or final layer 97 is an insulator. The ground leads 100 and 140 are preferably, as shown, passing nearer the periphery of the substrates than any of the other circuit elements in order to form essentially a 360° shield around the active area of the film, the contact areas, and the leads from the environment, yet this shield is flexible. That is, if vertical lines were drawn between the leads 100 and 140, these lines would define a boundary around the contact areas and leads.

The seven layers 91–97 are simply sandwiched together with the contacts, electrodes, and leads therein and held together by means well known in the art, such as epoxy. The substrates 91 and 93–97 (and the layer 92, as well) serve to electrically insulate the contacts and leads and as a platform on which the contacts and leads are supported and protected.

The electrodes 131–136 pass through through-holes in the substrates, i.e., electrode 131 passes through through-holes 141, 141*a* in layers 95, 94, respectively, and a through-hole (not shown) in layer 93. Electrode 132 passes through through-holes 142, 142*a* (FIG. 6) and 142*b* (FIG. 7A) in layers 95, 94, and 93, respectively. Electrode 133 passes through through-hole 143 in layer 94 and a through-hole (not shown) in layer 93. Similarly, electrode 134 passes through through-hole 144 in layer 94 and a through-hole (not shown) in layer 93. Electrode 135 passes through a through-hole 145 in layer 93 (FIG. 7), and electrode 136 passes through a through-hole (not shown) in layer 93.

FIG. 7 shows how the fifth electrode 135 passes from the fifth sensor contact area 115, laying on top of the third layer 93, through a through-hole 145 in the third layer into the fifth lead line 125 at the bottom of the third layer 93. The sixth lead line 126 cannot be seen in this view because it ends prior to where the vertical section is taken from FIG. 6, as can be seen in FIG. 6. If a cross section is taken in FIG. 6 through the second contact area 112 at the second electrode, for example, along line 7A—7A, then as shown in FIG. 7A, one can see the second electrode 132 passing through through-holes 142*b*, 142*a*, and 142 in the third through fifth layers 93–95 to connect the contact 112 with the second lead 122. The first through fourth leads cannot be seen in FIG. 7A because they end prior to where the vertical section is taken from FIG. 6.

As discussed above, the flexible circuit, i.e., the flexible layers 91–97 and leads 121–126, leaves the sensor assembly 78 and pass into the connection assembly 80, to the left of line B—B, as is shown in FIG. 6. The leads continue through assembly 80 to their ends, where each lead connects to a respective one of pins 201 to 206, as shown in FIGS. 4 and 5. That is, lead 121 connects to pin 201, lead 122 connects to pin 202, etc. The ground leads 100 and 140 pass through the connection assembly and connect to a pin 207. These pins 201–207 plug into an amplifier 210 mounted to the underside of guitar top 68, which amplifier may be conventional. Connection of the leads to the pins 201 to 207 is preferably accomplished using a pin header array, as is well known in the flexible circuit art.

The flexible circuit of this embodiment and others is so flexible and resilient that it can be folded into a U-shape for use, can be made flat before use, and can be twisted or folded into almost any shape.

FIG. 8 shows an exploded view of an alternate embodiment for the sensor assembly 78 in which three lead lines are printed on one substrate so that first through sixth leads 211–216 are on two layers instead of using three layers. In this embodiment, the layers 91 and 92 are the same as in the embodiment of FIG. 6. In the third layer 93, the six sensor contact areas 111–116 are the same as in the embodiment of FIG. 6, but three lead wires 214–216 are put on the bottom of the third layer instead of two lead wires. Moreover, the fourth layer 94 has three lead wires 211–213 for communicating with the electrodes from the first three sensor contact areas 111–113, respectively. The last two layers 96, 97 are also the same as in the embodiment of FIG. 6. Accordingly, in the embodiment of FIG. 8, due to putting three sensor lead wires per layer, layer 95 is eliminated, and a thinner sensor is achieved. While an even thinner profile would be desirable, due to the typical thickness of a saddle and typical thicknesses of lead lines, it can be difficult to get all six lead lines on one layer.

The total thickness of the resultant sensor of six or seven layers can be as low as sixteen, or even twelve, thousandths of an inch or lower, since it is preferable to make each substrate and the PVDF film as thin as practical, e.g., about 2 to 3 mils for KAPTON™ and about 1 mil for PVDF film. That is, in the invention, the creation of a flexible circuit by printing lead lines on a flexible layer (i.e., creating a flex circuit) and printing contact areas for contacting a piezoelectric film, bulky cables, frames, and conductors are eliminated. Moreover, the printing of the ground leads which pass proximate the periphery of the second and sixth layers provides a flexible electric shield for the circuit. This structure allows extreme miniaturization of the pickup and avoids the difficulty of connecting wires or cables to contacts at the piezoelectric element. In addition, electrical isolation of the lead lines by means of the substrates until they reach and connect to the pre-amp or amplifier, rather than summing all of the signals from each active contact area together by connecting them all to a coaxial cable inside of the pickup proximate the contact areas, minimizes capacitive reactance between the contact areas and thus preserves fidelity.

In accordance with another aspect of the invention, the bottom of the saddle has a convex curve such that, regardless of rocking under string pressure, the saddle contacts sensor assembly 78 at, or substantially at, the centerline of the piezoelectric film. Referring back to FIG. 3, saddle 72 has a curved bottom 72*a* so it contacts the sensor assembly 78 near its centerline where the apex of the curve is, rather than at a forward edge 72*b*. This central contact line provides more consistent pressure from the saddle on the piezoelectric film in the sensor assembly 78, i.e., contact which is consistently at a location at or near the centerline of the sensor and more consistent static pressure on the piezoelectric film, which yields more uniform electrical output and string-to-string sound balance. One preferred range of curvature of the saddle bottom is between 0.093 inch to 0.250 inch radius with a most preferred radius equal to the saddle thickness (to provide a semicircular surface).

To illustrate the importance of the saddle contacting the pickup at or near the centerline of the pickup, the following exemplary dimensions for a saddle and pickup are provided. A conventional saddle is approximately 90 thousandths of an inch thick, and so the sensor assembly 78 is made to be almost this width. The contacts 111–116 in the sensor assembly are preferably on the order of 50 to 60 thousandths of an inch in width and are centrally placed with respect to the width of the substrate. Accordingly, there are "dead" spots of about 15 to 20 thousandths of an inch on each side of the contact areas. It can thus be seen that it is quite critical to have the saddle bottom contact the pickup at, or approximately at, the pickup's centerline so as to ensure that the contact areas will be under the line of contact.

The convex curve of the saddle bottom could also take the form of a triangle, or a triangle with a small radius at the vertex which contacts the pickup, or similar geometric shapes which have an apex near or at the center of the saddle's thickness.

FIG. 8A is a view similar to FIG. 8, but of another embodiment of the invention, where a single contact area 262 is used for receiving the electrical signals corresponding to all six strings. In this embodiment, there are five layers 251–255. The first layer 251 is identical to the layer 91, and the fifth layer is identical to the layer 97, of the embodiment of FIG. 6. The second layer 252 is the same as the second layer 92 of FIG. 6, including a lead 258 connected to ground the same as lead 100. The second layer is formed of PVDF. An active area 260 of the layer 252 is one large rectangle because, in this embodiment, a single contact area 262 formed by one large rectangle is used. Accordingly, there is only one lead 263 printed on the bottom of the third layer 253, which connects to the contact area 262 by an electrode 264 passing through a through-hole (not shown) in the third layer. The fourth layer 254 is identical to the sixth layer 96 of FIG. 6, including a lead 266 to ground printed on its bottom, which is the same as the lead 140 of FIG. 6. As in the prior embodiments, the layers are sandwiched together and held together by using conductive and nonconductive epoxies, where appropriate. The pickup of FIG. 8A is extremely thin, e.g., nine thousandths of an inch, as each KAPTON™ layer is preferably on the order of 2 to 3 mils and the PVDF is on the order of 1 mil.

Figure 9:
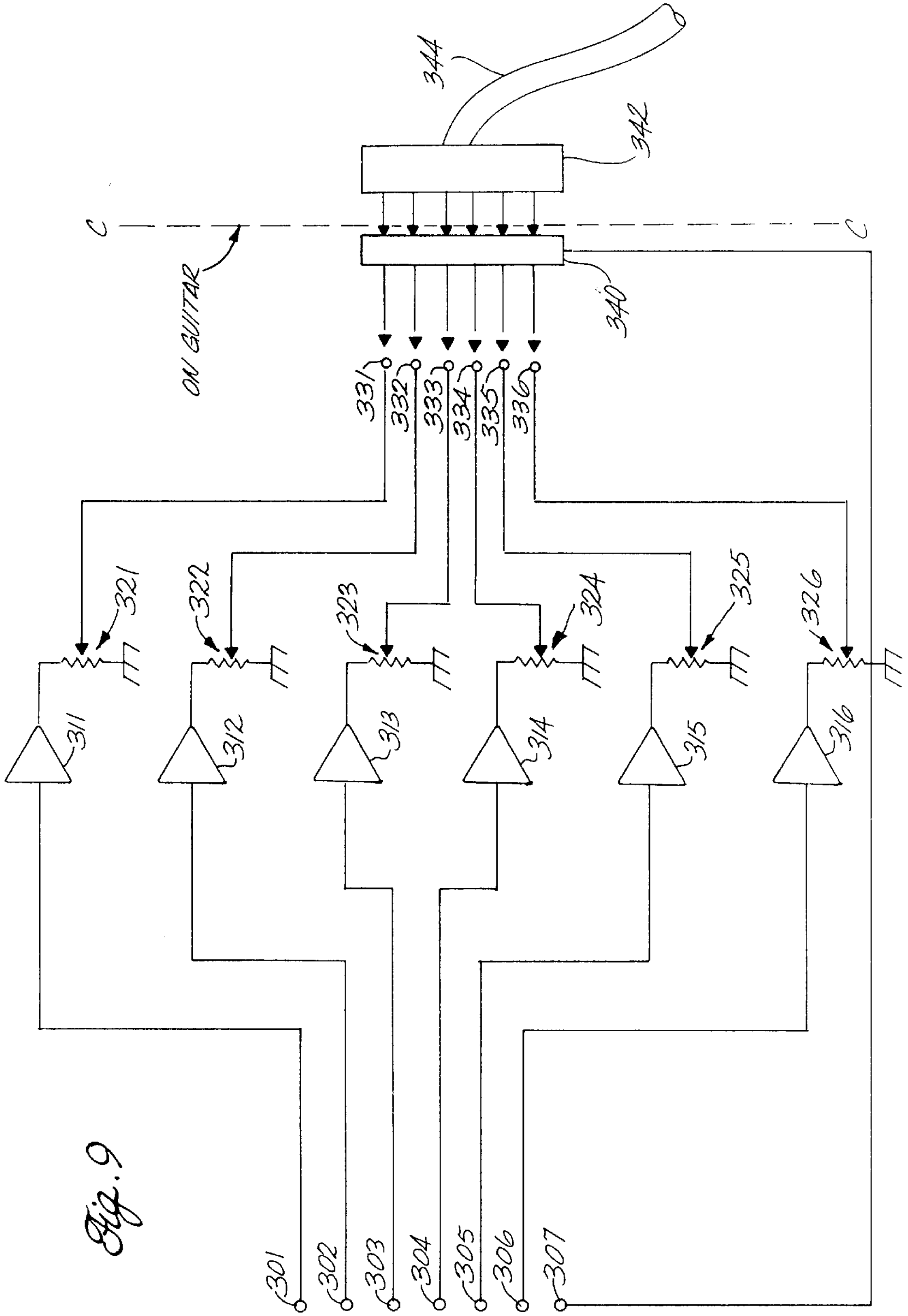
FIGS. 9–11 are circuit diagrams of three amplifiers for purposes of explaining how they connect to the pickup of FIG. 5.
Figure 10:
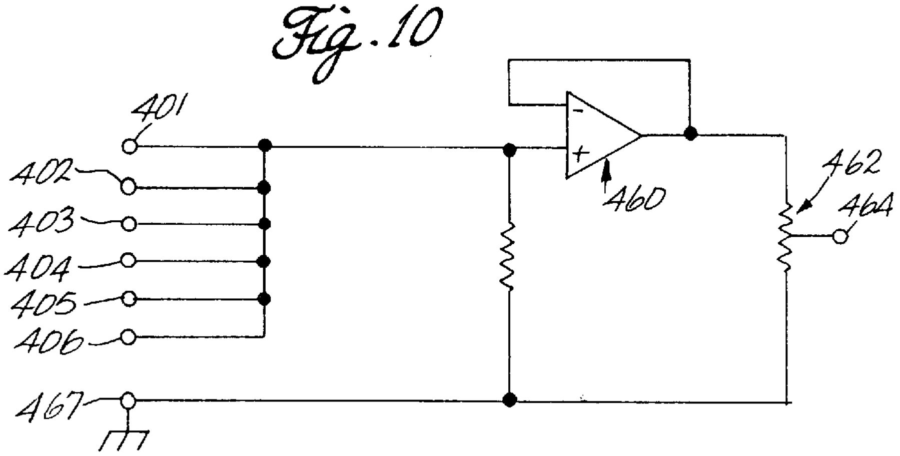
Figure 11:
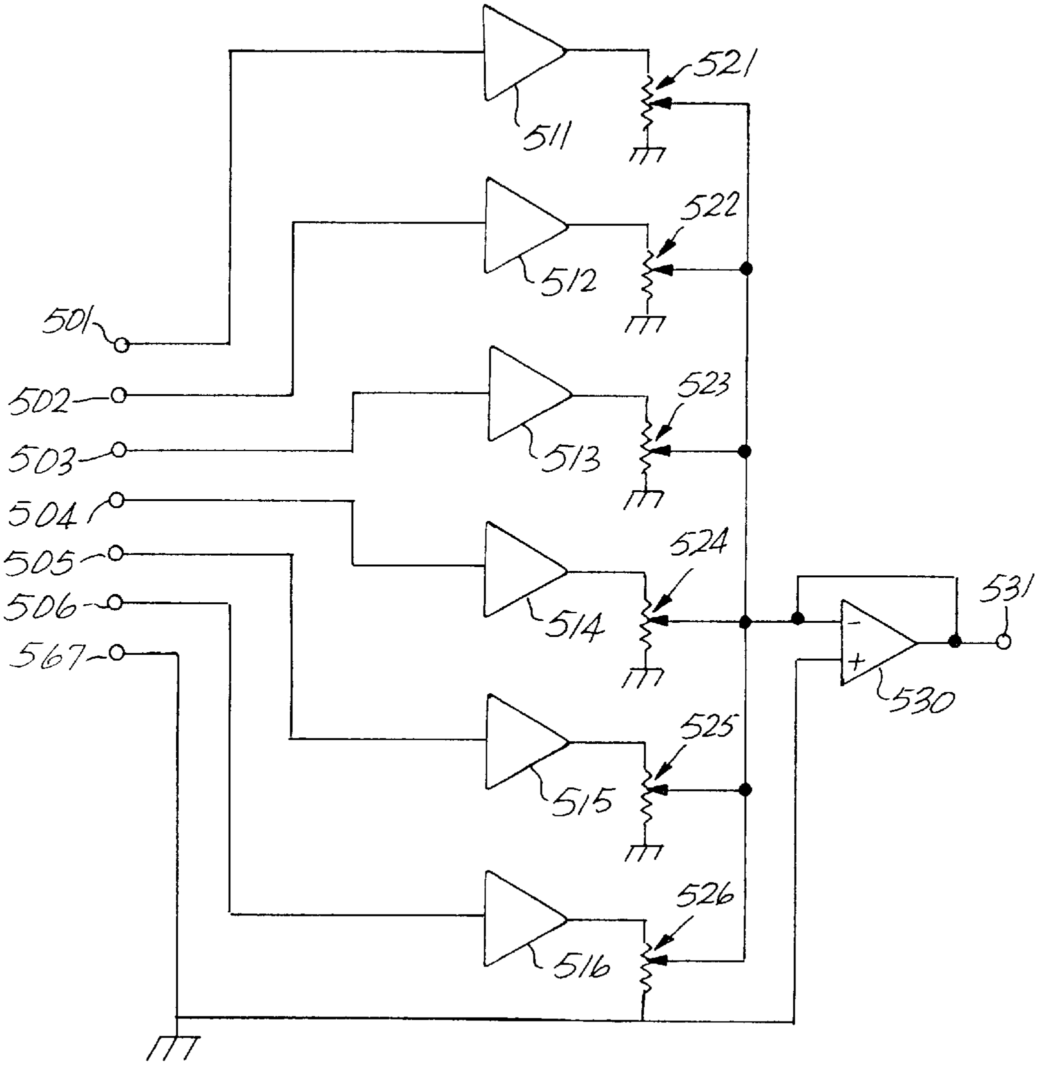

Connection of the pickup outputs at pins 201–206 and the ground line at pin 207 of the embodiment of FIG. 6 is illustrated in FIGS. 9–11, where suitable amplifiers are shown. In FIG. 9, the amplifier receives the seven pins 201–207 at contacts 301–307, respectively, and individually amplifies each signal from pins 201–206 at amps 311–316, respectively. The amps output signals through potentiometers 321–326, respectively, so that the relative amplification levels of each signal can be varied as desired. The potentiometer output signals are carried to contacts 331–336, respectively, where they connect to six leads of a seven- pin output connector 340, i.e., an output jack. The seventh pin receives the ground line. The output jack 340 and all of the circuitry to the left of a line C—C in FIG. 9 is on-board the guitar body. The jack 340 is at the guitar's surface, where a plug 342 plugs into the jack and carries the six output signals through a cord 344 to a powerful amplifier or other external device as is well known in the art. This amplifier yields what is known as full hexaphonic output.

Another suitable amplifier hookup for use with the invention is shown in FIG. 10. It is known as hexagonal summed to mono, i.e., the six outputs from the sensor assembly at pins 201–206 meet contacts 401–406, respectively, and are fed to the positive terminal of a summing amplifier 460. The summing amplifier is taken at a potentiometer 462 connected to an output terminal 464. The ground pin 207 connects to a ground contact 467.

A third suitable amplifier is shown in FIG. 11. It is known as hexagonally adjustable summed to mono post pre-amp. Each pin 201–206 connects to input contacts 501–506, which, in turn, are fed to amps 511–516, respectively. The amps' outputs are passed through potentiometers 521–526, respectively, and summed by a summing amplifier 530 to result in a single output at contact 531. Ground pin 207 connects to a ground contact 567 which also connects to the positive input of the summing amplifier.

In the full hexagonal output amp of FIG. 9, each input has its own pre-amp and individual volume control allowing adjustment of string-to-string balance. Since each sensor has its own separate pre-amp, each sensor is kept electrically independent from the other sensor areas. This eliminates a main cause of poor sound in pickups, i.e, it eliminates capacitive reactance between sensors. This is also true of the hexagonal adjustable summed to mono post pre-amp amplifier of FIG. 11. However, in the amplifier of FIG. 11, the outputs from the six strings are eventually summed into a single output.

Where there is only one contact area, as in FIG. 8A, a pin header array with just two pins, i.e., an output pin for the lead 264 and a ground pin for the grounded leads 258, 266, is used.

Figure 12:
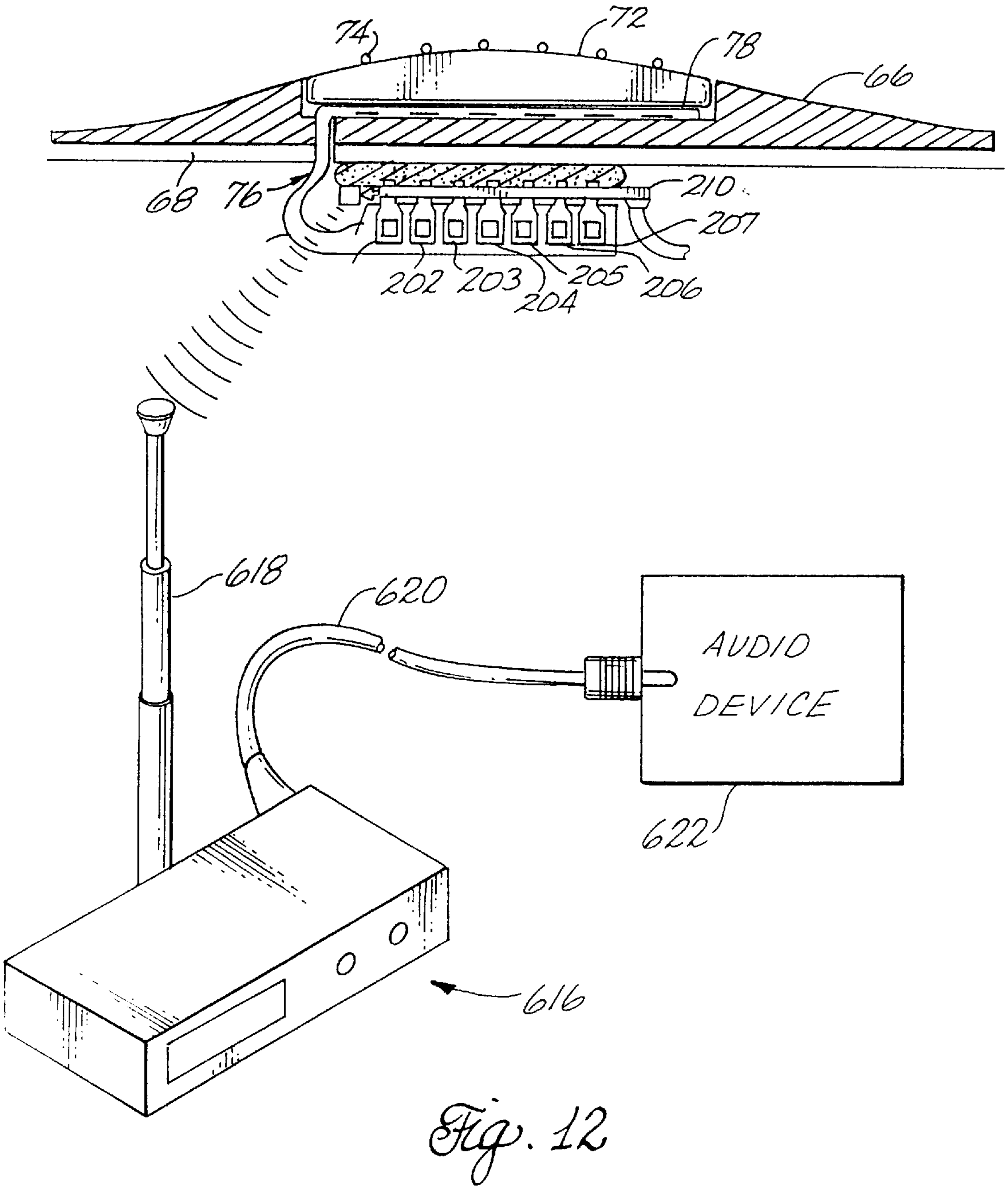
FIG. 12 is a semi-schematic view of another embodiment of the invention in which an FM transmitter is used on the guitar.

In accordance with a further aspect of the invention, and with reference to FIG. 12, an amplifier, such as an input amplifier or control amplifier or pre-amp, such as input amplifier 210 of FIG. 5, is also connected to an FM transmitter 614 which is built into the amplifier. The FM transmitter sends the electrical signals corresponding to the vibrations of the strings by means of FM radio waves to an FM wireless receiver 616. The receiver 616 picks up the signals at an antenna 618, and outputs them through a wire 620 to an audio device 622, such as an audio amplifier, PA, or other audio device. This aspect of the invention may stand on its own or be combined with the inventive pickup and/or saddle.

Figure 13:
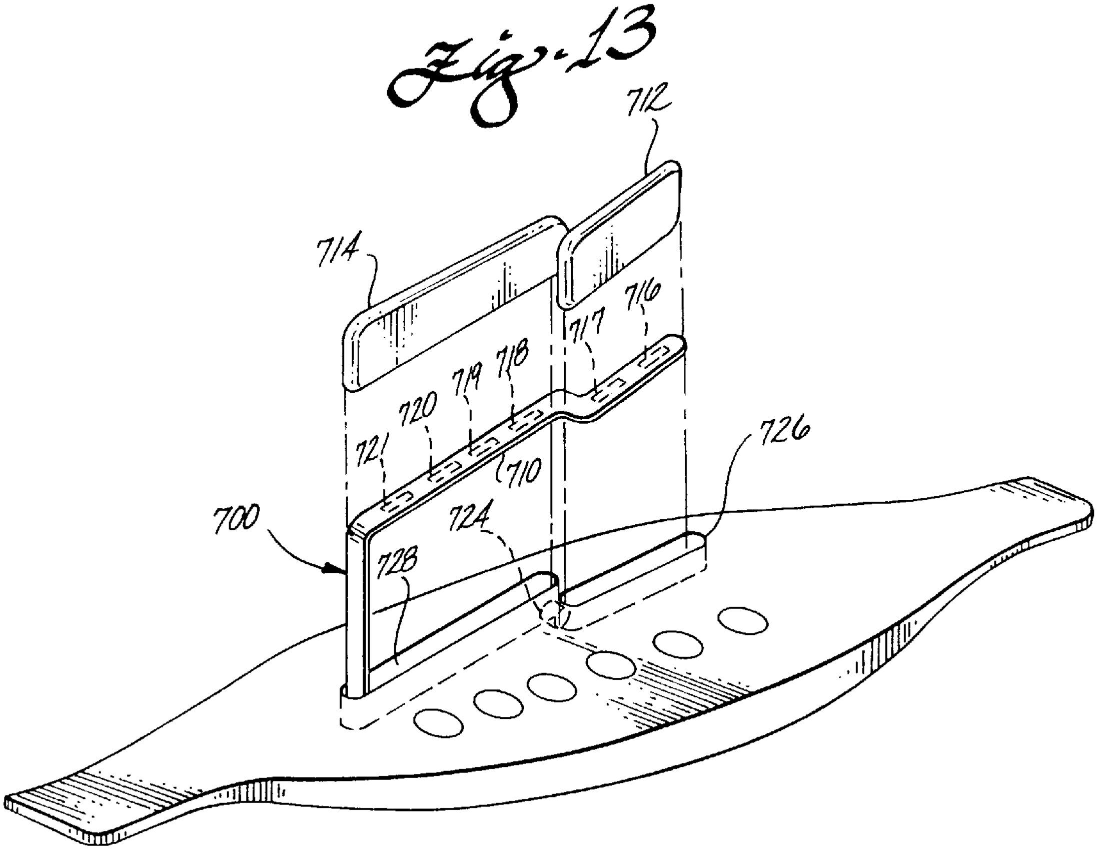
FIG. 13 is a semi-schematic exploded perspective view of a bridge assembly including a split saddle and a bent pickup according to a further embodiment of the invention.

It would be readily apparent to one of ordinary skill in the art that the above embodiment of the invention is a preferred embodiment and that many other versions of the invention are possible. For example, in the case of a split saddle (two saddles), as shown in FIG. 13, a dog leg or bent version of a flexible pickup 700 is used. That is, the leads and substrates are constructed with a bent shape so that a sensor assembly portion 710 of the pickup is underneath each saddle 712, 714 of the split saddle. The contact areas 716–721 are placed underneath the strings in registry therewith. As in the embodiment of FIG. 8A, one long contact area may be used. The flexibility of the pickup assembly allows it to be fed through a tunnel 724 between slots 726, 728 for the saddles 712, 714, respectively.

Where capturing vibrations parallel with the strings (that would not be captured by undersaddle pickups) are of importance, a second pickup constructed with the same flexible circuit structure as the first pickup can be used The sensor portion of this second pickup is, with reference to FIG. 3, placed at 90° to the undersaddle pickup 76 and is at the rear edge 72*c* (the edge opposite front edge 72*b*) of the saddle 72. In other words, the second pickup will have its sensor assembly placed at 90° to the sensor assembly of the first pickup and will lie substantially flat against a rear wall 64*b* of a slot 64 in which the saddle 72 is located. Thus, the sensor of the second pickup will be pinched between the rear edge 72*c* of the saddle and the rear wall 64*b* of the slot. (The curve of the saddle's bottom in a preferred embodiment will be designed so that the rear edge 72*c* of the saddle will contact the second sensor at or near a centerline too.) capturing parallel vibrations would greatly enhance the feedback resistance of the guitar. More specifically, feedback is generated and received mainly by the first, undersaddle pickup, and only to a limited extent by the second, vertical pickup. If the signals from the first and second pickups are combined, the feedback sensed by the first pickup will be less significant to the combined signal than it is to the signals solely from the first pickup. The signals may be combined by mixing the first string's signals of each pickup, the second string's signals of each pickup, etc., or combining all outputs from each sensor.

It is also possible to form the first pickup and second pickup in one integral assembly such that it would have an L-shaped cross section so that the sensor wraps under and to the rear of the saddle. Thus, contact areas sensitive to vibrations of the saddle in directions parallel and perpendicular to the strings can be provided. In these embodiments, the parallel and perpendicular sensor outputs may each be separately processed by summing the perpendicular and parallel sensor outputs separately to mono and then attaching them to individual pre-amplifiers to allow individual volume and phase adjustments for the perpendicular and parallel axes, or by using dual hexaphonic amplifiers to obtain individual volume and phase adjustments for each string in each of the perpendicular and parallel axes.

Another variation of the invention which would be possible is to use the thin sensor assembly in accordance with the invention with conventional wires, to at least obtain the advantages of the thin, flexible sensor assembly of about sixteen thousandths of an inch or less.

Figure 14:
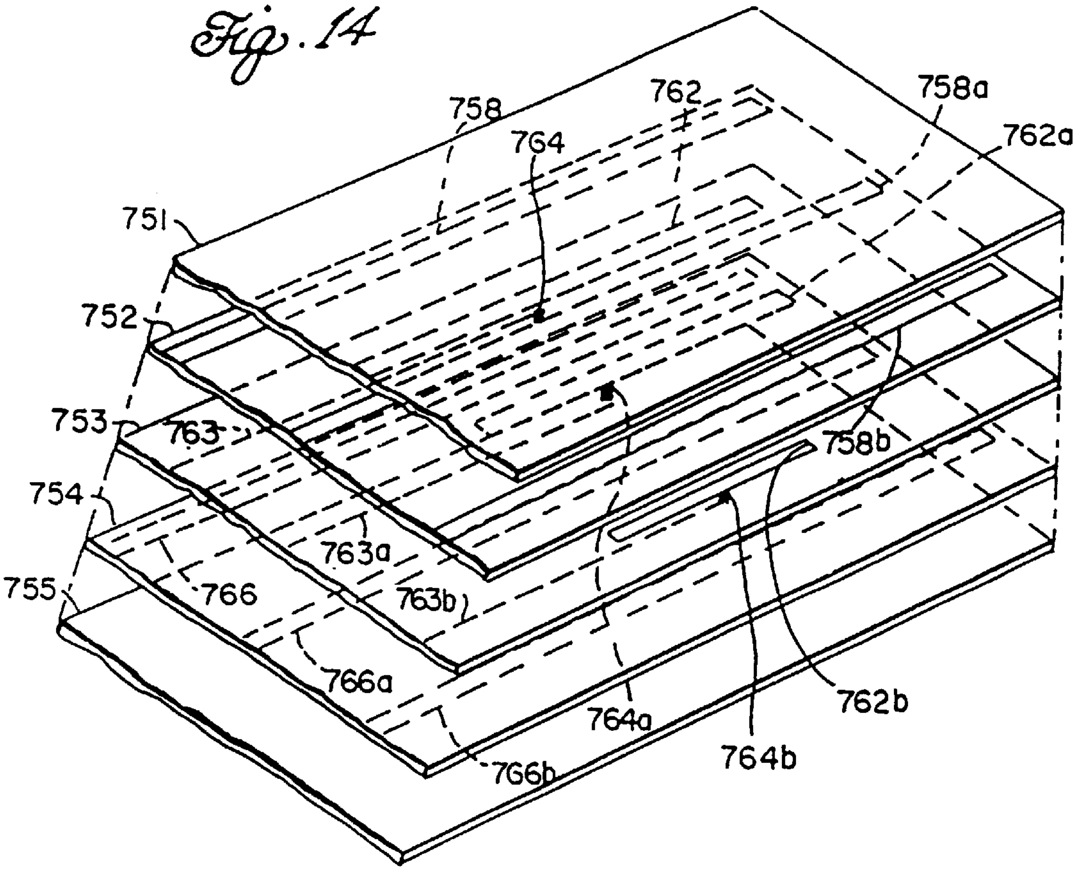
FIG. 14 is a semi-schematic perspective view showing multiple sheets with circuit elements for a plurality of pickups printed thereon at spaced-apart intervals, for purposes of explaining a method of manufacturing pickups according to the invention.
Figure 15:
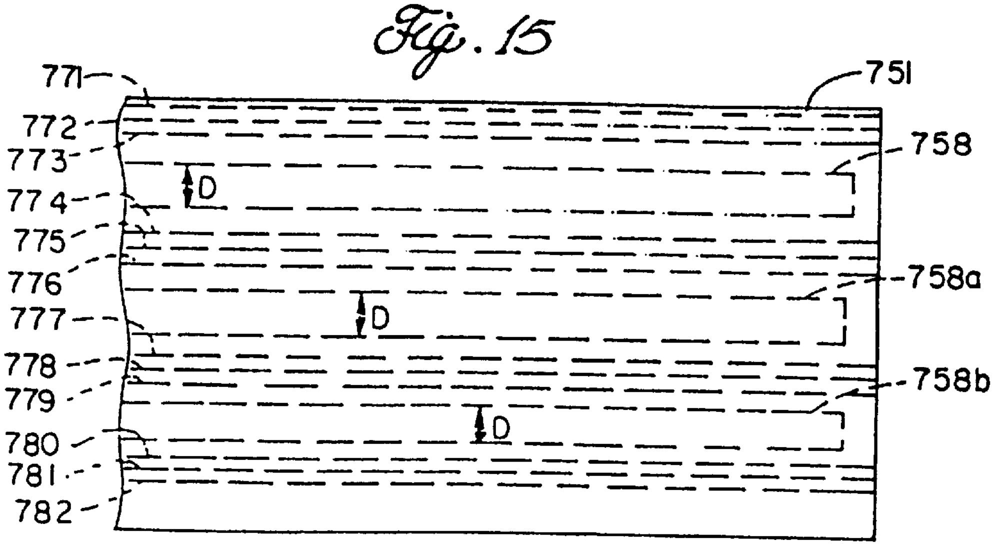
FIG. 15 is a semi-schematic top view of the sheets of FIG. 14 for purposes of explaining a cutting operation of the method in order to separate the pickups into individual pickups of desired width.

With reference to FIGS. 14 and 15, a method of manufacturing the pickups such as those shown in FIG. 8A with a single contact is shown. The same method may be used for the pickups of FIGS. 6 and 8, too. First, five sheets 751–755 are obtained. The first or top sheet 751 and the third through fifth sheets 753–755 are of KAPTON™, and the second sheet 752 is made of PVDF. These sheets have the various circuit elements printed thereon at spaced intervals for several pickup circuits, e.g., three circuits are shown in FIG. 14. That is, the second sheet 752 has three ground leads 758, 758*a*, 758*b* printed on it. The third sheet 753 has three contact areas 762, 762*a*, 762*b* printed on it below the ground leads printed on the sheet 752. The underside of the third sheet 753 has three leads 763, 763*a*, 763*b* printed on it, which leads connect via electrodes 764, 764*a*, 764*b* to the contact areas 762, 762*a*, and 762*b*, respectively. The fourth sheet 754 has three ground leads 766, 766*a*, 766*b* printed on it in registration with the ground leads 758, 758*a*, 758*b* on the second sheet 752. The five layers are joined together by epoxy.

Once the sheets are joined, the individual pickups must be formed by cutting the sheets between each individual pickup circuit. Since, in a preferred embodiment of the pickup according to the invention, the ground leads are the widest portion of the circuitry printed on the substrates, as long as cutting takes place outside the edges of the ground leads, a pickup of any desired width can be formed simply by changing the position of the cutting apparatus such as the blades of a steel rule die cutter. This principle is illustrated in FIG. 15 by showing the outlines of each of the top ground leads 758, 758*a*, 758*b*, each having a predetermined width D, e.g., 0.075 inch, and various possible cutting lines 771–782 where the sheets may be cut. For example, cutting the sheets at lines at 773, 774, 776, 777, 779 and 780 would form three relatively thin pickups, such as for a 0.093 inch saddle. Cutting the sheets at lines 772, 775, 778 and 781 might form three intermediate size pickups with a width suitable for a saddle of 0.125 inch in thickness. As can readily be seen from FIG. 15, cutting could take place anywhere outside the confines of the ground leads so as to produce pickups of desired widths.

Pickups of different widths could be formed from the assembly of FIG. 15. For example, three pickups of different widths can be formed by cutting at lines 771, 776 to form a first relatively wide pickup, lines 776 and 777 to form a second relatively thin pickup and lines 778, 781 to form a third pickup of medium width with respect to the other two pickups. In fact, in a preferred embodiment of the invention, since the width of the ground leads is 0.075 inch, cutting can take place anywhere outside the ground leads to achieve a pickup suitable for any width saddle. Moreover, cutting could even take place after manufacture at the installation stage if a pickup is too wide for a particular saddle. Thus, distance D is constant (it could be varied, if desired), yet cutting may take place to create pickups of different widths, and even different lengths. Typically, the width of the pickup should be about 3 to 5 mils less than the thickness of the saddle that the pickup is intended for. Furthermore, the pickup is also configured so that the length may be trimmed, even by cutting off or through a contact area, without affecting the operation of the pickup's circuitry that remains. To facilitate this lengthwise cutting, it is preferred to have the leads connect to the contact areas at the edges thereof nearest the connection assembly.

In view of the above, the invention is to be measured by the claims and is not limited to the specific embodiments shown.

What is claimed:

1. A flexible pickup circuit assembly for mounting in a stringed instrument under an instrument saddle which couples the vibratory action of the strings to the pickup assembly, said pickup assembly comprising:

at least two flexible insulating substrate layers;

a flexible piezoelectric strip for converting vibrations of the saddle into electrical signals, sandwiched between two of said flexible insulating substrate layers;

at least one lead electrically connected to said piezoelectric strip, said lead for carrying the electrical signals from the piezoelectric strip for electrical connection to an amplifier of the stringed instrument;

wherein said flexible pickup assembly comprises a first portion configured to underlie the saddle and extend in a horizontal plane parallel to the plane of the instrument strings and a second portion which is bendable out of the horizontal plane in which the first portion lies.

2. The flexible pickup assembly of claim 1, wherein said flexible pickup assembly is sufficiently flexible so that the pickup assembly can be bent into a form wherein the first portion of said pickup assembly is at an approximately ninety degree angle from the second portion of said pickup assembly.

3. The flexible pickup assembly of claim 1, wherein said flexible pickup assembly is sufficiently flexible so that the pickup assembly can be bent into a form having a substantially L-shaped configuration, with the first portion of the pickup assembly being one leg of the L and the second portion of the pickup assembly being the other leg of the L.

4. The flexible pickup assembly of claim 1, wherein the overall thickness of said assembly is less than 100 thousandths of an inch.

5. The flexible pickup assembly of claim 1, wherein the overall thickness of said assembly is less than 25 thousandths of an inch.

6. The flexible pickup circuit assembly of claim 1, wherein the overall thickness of said assembly is about 14 thousandths of an inch.

7. The flexible pickup circuit assembly of claim 1, wherein the overall thickness of said assembly is about 12 thousandths of an inch.

8. The flexible pickup assembly of claim 1, wherein said assembly has torsional flexibility.

9. A flexible pickup circuit assembly for mounting in a stringed instrument under an instrument saddle which couples the vibratory action of the strings to the pickup assembly, said pickup assembly comprising:

a flexible strip of piezoelectric material for converting vibrations of the saddle into electrical signals;

a first flexible insulating substrate on one side of the piezoelectric strip;

a second flexible insulating substrate on the opposite side of the piezoelectric strip from the first such substrate; and an electrical circuit comprising at least one electrical contact for picking up the electrical signals from the piezoelectric strip and at least one electrically conductive lead line for carrying the electrical signals from such a contact for electrical connection to an amplifier;

wherein the electrical circuit, the piezoelectric strip, and the flexible insulating substrates are all sandwiched together, and wherein the thickness of the assembly is less than 100 thousandths of an inch.

10. The flexible pickup circuit assembly of claim 9, wherein said at least one electrical contact is sandwiched between the first flexible insulating substrate and the piezoelectric strip and wherein the circuit further comprises a ground sandwiched between the second flexible insulating substrate and the piezoelectric strip.

11. The flexible pickup assembly of claim 9, wherein said flexible pickup assembly comprises a first portion configured to be mounted in said stringed instrument under the instrument saddle in a horizontal plane parallel to the plane of the instrument top, said assembly being sufficiently flexible so that the assembly can be bent into a form wherein a second portion of the assembly is bendable out of the horizontal plane.

12. The flexible pickup assembly of claim 11, wherein said flexible pickup assembly is sufficiently flexible so that the assembly can be bent into a form having a substantially L-shaped configuration, with the first portion of the assembly being one leg of the L and the second portion of the assembly being the other leg of the L.

13. The flexible pickup assembly of claim 11, wherein the assembly is sufficiently flexible so that the assembly can be bent into a form where the first portion is at an approximately 90 degree angle from the second portion of said assembly.

14. The flexible pickup assembly of claim 9, wherein the overall thickness of said assembly is less than 25 thousandths of an inch.

15. The flexible pickup assembly of claim 9, wherein the overall thickness of said assembly is about 16 thousandths of an inch.

16. The flexible pickup assembly of claim 9, wherein the overall thickness of said assembly is about 14 thousandths of an inch.

17. The flexible pickup assembly of claim 9, wherein the overall thickness of said assembly is about 12 thousandths of an inch.

18. The flexible pickup assembly of claim 9, wherein said assembly has torsional flexibility.

19. A method of manufacturing an undersaddle pickup of any selected width suitable for any given saddle width, the method comprising the steps of:

forming a pickup assembly having an overall thickness of less than 100 thousandths of an inch, said assembly comprising a plurality of flexible insulating substrates and a piezoelectric film sandwiched together and having circuit elements printed thereon for forming a circuit for sensing an electrical signal at the piezoelectric film in response to vibrations of a saddle being transferred to the film; and cutting the pickup assembly on either side of the circuit elements to form a pickup of a selected width suitable for a given saddle width, whereby when the pickup is installed under the saddle, the saddle will contact a surface of the pickup along the length of said pickup.

20. A method according to claim 19, wherein the step of cutting the selected width is within 0.005 inches of the given saddle width.

21. A method according to claim 19, wherein in the step of forming, there are circuit elements for forming multiple circuits side by side on the flexible substrates and the piezoelectric film, and wherein in the step of cutting, the substrates and film are cut between the circuits so as to form a plurality of pickups of selected widths.

22. The method of claim 19, wherein the overall thickness of said pickup assembly is less than 25 thousandths of an inch.

23. The method of claim 19, wherein the overall thickness of said pickup assembly is less than 16 thousandths of an inch.

24. The method of claim 19, wherein the overall thickness of said pickup assembly is about 14 thousandths of an inch.

25. The method of claim 19, wherein the overall thickness of said pickup assembly is about 12 thousandths of an inch.

26. A stringed instrument comprising:

a plurality of strings;

an instrument saddle having a top portion contacting the strings and a bottom surface;

a flexible pickup circuit assembly having first and second portions, wherein said first portion is mounted flat in contact with the bottom surface of the saddle wherein the saddle couples the vibrating action of the strings to said assembly, the assembly comprising:

at least two flexible insulating substrate layers;

a flexible piezoelectric strip for converting vibrations of the saddle into electrical signals sandwiched between two of said flexible insulating substrate layers; and at least one lead electrically connected to said piezoelectric strip, said lead for carrying the electrical signals from the piezoelectric strip for electrical connection to an amplifier of the stringed instrument;

wherein said flexible pickup assembly is sufficiently flexible so that the second portion of the assembly is bent out of the plane in which the first portion resides.

27. The stringed instrument of claim 26, wherein said flexible pickup assembly is in a form wherein the first portion of said pickup assembly is at an approximately ninety degree angle from the second portion of said pickup assembly.

28. The stringed instrument of claim 26, wherein said flexible pickup assembly is in a form having a substantially L-shaped configuration, with the first portion of the pickup assembly being one leg of the L and the second portion of the pickup assembly being the other leg of the L.

29. The stringed instrument of claim 26, wherein the overall thickness of said assembly is less than 100 thousandths of an inch.

30. A stringed instrument comprising:

a plurality of strings;

an instrument saddle having a top portion contacting the strings; and a bottom surface;

a flexible pickup circuit assembly having first and second portions, said first portion mounted under the saddle in contact with the bottom surface of the saddle wherein the saddle couples the vibrating action of the strings to the pickup assembly, said pickup assembly comprising:

a flexible strip of piezoelectric material for converting vibrations of the saddle into electrical signals;

a first flexible insulating substrate on one side of the piezoelectric strip;

a second flexible insulating substrate on the on opposite side of the piezoelectric strip from the first such substrate; and an electrical circuit comprising at least one electrical contact for picking up the electrical signals from the piezoelectric strip and at least one electrically conductive lead line for carrying the electrical signals from such a contact for electrical connection to an amplifier;

wherein the electrical circuit, the piezoelectric strip, and the flexible insulating substrates are all sandwiched together, and wherein the thickness of the assembly is less than 100 thousandths of an inch.

31. The stringed instrument of claim 30, wherein said at least one electrical contact is sandwiched between the first flexible insulating substrate and the piezoelectric strip, and wherein the circuit further comprises a ground sandwiched between the second flexible insulating substrate and the piezoelectric strip.

32. The stringed instrument of claim 30, wherein said flexible pickup assembly is in a form having a substantially L-shaped configuration, with the first portion of the assembly being one leg of the L and the second portion of the assembly being the other leg of the L.

33. A flexible pickup circuit assembly for mounting in a stringed instrument under an instrument saddle which couples the vibratory action of the strings to the pickup assembly, said pickup assembly comprising:

an elongated flexible piezoelectric strip for converting vibrations of the saddle into electrical signals, said piezoelectric strip having first and second surfaces;

an elongated flexible insulating substrate on one side of the piezoelectric strip with a first surface of said insulating substrate facing the first surface of the piezoelectric strip and a second surface of said insulating substrate facing away from said piezoelectric strip; and at least one electrical contact area sandwiched between the piezoelectric strip and the first surface of said insulating substrate, wherein a lead is connected electrically to the electrical contact area for carrying electrical signals from the piezoelectric strip for electrical connection to an amplifier of the stringed instrument;

wherein said flexible pickup assembly comprises a first portion configured to underlie the saddle and extend in a horizontal plane parallel to the plane of the instrument strings and a second portion which is bendable out of the horizontal plane in which the first portion lies.

34. The flexible pickup assembly of claim 33, wherein said flexible pickup assembly is sufficiently flexible so that the pickup assembly can be bent into a form wherein the first portion of said pickup assembly is at an approximately ninety degree angle from the second portion of said pickup assembly.

35. The flexible pickup assembly of claim 33, wherein said flexible pickup assembly is sufficiently flexible so that the pickup assembly can be bent into a form having a substantially L-shaped configuration, with the first portion of the pickup assembly being one leg of the L and the second portion of the pickup assembly being the other leg of the L.

36. The flexible pickup assembly of claim 33, wherein the overall thickness of said assembly is less than 100 thousandths of an inch.

37. The flexible pickup assembly of claim 33, wherein the overall thickness of said assembly is less than 25 thousandths of an inch.

38. The flexible pickup circuit assembly of claim 33, wherein the overall thickness of said assembly is about 14 thousandths of an inch.

39. The flexible pickup circuit assembly of claim 33, wherein the overall thickness of said assembly is about 12 thousandths of an inch.

40. The flexible pickup assembly of claim 33, wherein said assembly has torsional flexibility.

41. The flexible pickup assembly of claim 33, wherein a ground is on the second surface of the piezoelectric strip.

42. A flexible pickup circuit assembly for mounting in a stringed instrument under an instrument saddle which couples the vibratory action of the strings to the pickup assembly, said pickup assembly comprising:

a flexible strip of piezoelectric material for converting vibrations of the saddle into electrical signals, said piezoelectric strip having first and second surfaces;

a flexible insulating substrate on one side of the piezoelectric strip, with a first surface of said insulating substrate facing the first surface of the piezoelectric strip; and an electrical circuit comprising at least one electrical contact for picking up the electrical signals from the piezoelectric strip and at least one electrically conductive lead line for carrying the electrical signals from such a contact for electrical connection to an amplifier;

wherein the electrical contact is between the piezoelectric strip and the insulating substrate, and wherein the thickness of the assembly is less than 100 thousandths of an inch.

43. The flexible pickup circuit assembly of claim 42, wherein the circuit further comprises a ground on the second surface of the piezoelectric strip.

44. The flexible pickup assembly of claim 42, wherein said flexible pickup assembly comprises a first portion configured to be mounted in said stringed instrument under the instrument saddle in a horizontal plane substantially parallel to the plane of the instrument top, said assembly being sufficiently flexible so that the assembly can be bent into a form wherein a second portion of the assembly is bendable out of the horizontal plane.

45. The flexible pickup assembly of claim 44, wherein said flexible pickup assembly is sufficiently flexible so that the assembly can be bent into a form having a substantially L-shaped configuration, with the first portion of the assembly being one leg of the L and the second portion of the assembly being the other leg of the L.

46. The flexible pickup assembly of claim 44, wherein the assembly is sufficiently flexible so that the assembly can be bent into a form where the first portion is at an approximately 90 degree angle from the second portion of said assembly.

47. The flexible pickup assembly of claim 42, wherein the overall thickness of said assembly is less than 25 thousandths of an inch.

48. The flexible pickup assembly of claim 42, wherein said assembly has torsional flexibility.

49. A method of manufacturing an undersaddle pickup of any selected width suitable for any given saddle width, the method comprising the steps of:

forming a pickup assembly having an overall thickness of less than 100 thousandths of an inch, said assembly comprising at least one flexible insulating substrate and a piezoelectric film sandwiched together and having circuit elements printed either on the insulating substrate or the piezoelectric film for forming a circuit for sensing an electrical signal at the piezoelectric film in response to vibrations of a saddle being transferred to the film; and cutting the pickup assembly on either side of the circuit elements to form a pickup of a selected width suitable for a given saddle width, whereby when the pickup is installed under the saddle, the saddle will contact a surface of the pickup along the length of said pickup.

50. A method according to claim 49, wherein in the step of forming, there are circuit elements for forming multiple circuits side by side on the flexible substrate and the piezoelectric film, and wherein in the step of cutting, the substrates and film are cut between the circuits so as to form a plurality of pickups of selected widths.

51. The method of claim 49, wherein the overall thickness of said pickup assembly is less than 25 thousandths of an inch.

52. A stringed instrument comprising:

a plurality of strings;

an instrument saddle having a top portion contacting the strings and a bottom surface;

a flexible pickup circuit assembly having first and second portions, wherein said first portion is mounted flat in contact with the bottom surface of the saddle wherein the saddle couples the vibrating action of the strings to said assembly, the assembly comprising:

a flexible piezoelectric strip for converting vibrations of the saddle into electrical signals, said piezoelectric strip having first and second surfaces;

an elongated insulating substrate on one side of the piezoelectric strip with a first surface of said insulating substrate facing the first surface of the piezoelectric strip and a second surface of said insulating substrate facing away from the piezoelectric strip;

at least one electrical contact area sandwiched between the first surface of the piezoelectric strip and the first surface of the insulating substrate, wherein a lead is connected electrically to the electrical contact area for carrying electrical signals from the piezoelectric strip for electrical connection to an amplifier of the stringed instrument;

wherein said flexible pickup assembly is sufficiently flexible so that the second portion of the assembly is bent out of the plane in which the first portion resides.

53. The stringed instrument of claim 52, wherein said flexible pickup assembly is in a form wherein the first portion of said pickup assembly is at an approximately ninety degree angle from the second portion of said pickup assembly.

54. The stringed instrument of claim 52, wherein said flexible pickup assembly is in a form having a substantially L-shaped configuration, with the first portion of the pickup assembly being one leg of the L and the second portion of the pickup assembly being the other leg of the L.

55. The stringed instrument of claim 52, wherein the overall thickness of said assembly is less than 100 thousandths of an inch.

56. The stringed instrument of claim 52, wherein a ground is on the second surface of the piezoelectric strip.

57. A stringed instrument comprising:

a plurality of strings;

an instrument saddle having a top portion contacting the strings; and a bottom surface;

a flexible pickup circuit assembly having first and second portions, said first portion mounted under the saddle in contact with the bottom surface of the saddle wherein the saddle couples the vibrating action of the strings to the pickup assembly, said pickup assembly comprising:

a flexible strip of piezoelectric material for converting vibrations of the saddle into electrical signals, said piezoelectric strip having first and second surfaces;

a flexible insulating substrate on one side of the piezoelectric strip, with a first surface of said insulating substrate facing the first surface of the piezoelectric strip; and an electrical circuit comprising at least one electrical contact for picking up the electrical signals from the piezoelectric strip and at least one electrically conductive lead line for carrying the electrical signals from such a contact for electrical connection to an amplifier;

wherein the electrical contact is between the first surface of the piezoelectric strip and the first surface of the insulating substrate, and wherein the thickness of the assembly is less than 100 thousandths of an inch.

58. The stringed instrument of claim 57, wherein the circuit further comprises a ground on the second surface of the piezoelectric strip.

59. The stringed instrument of claim 57, wherein said flexible pickup assembly is in a form having a substantially L-shaped configuration, with the first portion of the assembly being one leg of the L and the second portion of the assembly being the other leg of the L.

60. A flexible pickup circuit assembly for mounting in a stringed instrument under an instrument saddle which couples the vibratory action of the strings to the pickup assembly, said pickup assembly comprising:

at least two flexible insulating substrate layers;

a flexible sensor for converting vibrations of the saddle into electrical signals, sandwiched between two of said flexible insulating substrate layers; and at least one lead electrically connected to said sensor, said lead for carrying the electrical signals from the sensor for electrical connection to an amplifier of the stringed instrument;

wherein said flexible pickup assembly comprises a first portion configured to underlie the saddle and extend in a horizontal plane parallel to the plane of the instrument strings and a second portion which is bendable out of the horizontal plane in which the first portion lies.

61. The flexible pickup assembly of claim 60, wherein said flexible pickup assembly is flexible so that the pickup assembly can be bent into a form wherein the first portion of said pickup assembly is at an approximately ninety degree angle from the second portion of said pickup assembly.

62. The flexible pickup assembly of claim 60, wherein said flexible pickup assembly is flexible so that the pickup assembly can be bent into a form having a substantially L-shaped configuration, with the first portion of the pickup assembly being one leg of the L and the second portion of the pickup assembly being the other leg of the L.

63. The flexible pickup assembly of claim 60, wherein the overall thickness of said assembly is less than 100 thousandths of an inch.

64. The flexible pickup assembly of claim 60, wherein the overall thickness of said assembly is less than 25 thousandths of an inch.

65. The flexible pickup circuit assembly of claim 60, wherein the overall thickness of said assembly is about 14 thousandths of an inch.

66. The flexible pickup circuit assembly of claim 60, wherein the overall thickness of said assembly is about 12 thousandths of an inch.

67. The flexible pickup assembly of claim 60, wherein a ground surface is on both sides of the flexible sensor.

68. The flexible pickup assembly of claim 60, wherein said assembly has torsional flexibility.

69. A flexible pickup circuit assembly for mounting in a stringed instrument under an instrument saddle which couples the vibratory action of the strings to the pickup assembly, said pickup assembly comprising:

a flexible strip of sensor material for converting vibrations of the saddle into electrical signals;

a first flexible insulating substrate on one side of the sensor strip;

a second flexible insulating substrate on the opposite side of the sensor from the first such substrate; and an electrical circuit comprising at least one electrical contract for picking up the electrical signals from the sensor strip and at least one electrically conductive lead line for carrying the electrical signals from such a contract for electrical connection to an amplifier;

wherein the electrical circuit, the sensor strip, and the flexible insulating substrates are all sandwiched together, and wherein the thickness of the assembly is less than 100 thousandths of an inch.

70. The flexible pickup circuit assembly of claim 69, wherein said at least one electrical contact is sandwiched between the first flexible insulating substrate and the sensor strip and wherein the circuit further comprises a first ground sandwiched between the second flexible insulating substrate and the sensor strip.

71. The flexible pickup circuit assembly of claim 70, additionally comprising a second ground on the opposite side of the sensor strip from the first ground.

72. The flexible pickup circuit assembly of claim 69, wherein said flexible pickup assembly comprises a first portion configured to be mounted in said stringed instrument under the instrument saddle in a horizontal plane substantially parallel to the plane of the instrument top, said assembly being flexible so that the assembly can be bent into a form wherein a second portion of the assembly is bendable out of the horizontal plane.

73. The flexible pickup circuit assembly of claim 72, wherein said flexible pickup circuit assembly is flexible so that the assembly can be bent into a form having a substantially L-shaped configuration, with the first portion of the assembly being one leg of the L and the second portion of the assembly being the other leg of the L.

74. The flexible pickup circuit assembly of claim 72, wherein the assembly is flexible so that the assembly can be bent into a form where the first portion is at an approximately 90 degree angle from the second portion of said assembly.

75. The flexible pickup circuit assembly of claim 70, wherein the overall thickness of said assembly is less than 25 thousandths of an inch.

76. The flexible pickup circuit assembly of claim 70, wherein the overall thickness of said assembly is 16 thousandths of an inch.

77. The flexible pickup circuit assembly of claim 70, wherein the overall thickness of said assembly is about 14 thousandths of an inch.

78. The flexible pickup circuit assembly of claim 70, wherein the overall thickness of said assembly is about 12 thousandths of an inch.

79. The flexible pickup circuit assembly of claim 70, wherein said assembly has torsional flexibility.

80. A method of manufacturing an undersaddle pickup of any selected width suitable for any given saddle width, the method comprising the steps of:

forming a pickup assembly having an overall thickness of less than 100 thousandths of an inch, said assembly comprising a plurality of flexible insulating substrates and a sensor film sandwiched together and having circuit elements printed thereon for forming a circuit for sensing an electrical signal at the sensor film in response to vibrations of a saddle being transferred to the film; and cutting the pickup assembly on either side of the circuit elements to form a pickup of a selected width suitable for a given saddle width, whereby when the pickup is installed under the saddle, the saddle will contact a surface of the pickup along the length of said pickup.

81. A method according to claim 80, wherein the step of cutting the selected width is within 0.005 inches of the given saddle width.

82. A method according to claim 80, wherein in the step of forming, there are circuit elements for forming multiple circuits side by side on the flexible substrates and the sensor film, and wherein in the step of cutting, the substrates and film are cut between the circuits so as to form a plurality of pickups of selected widths.

83. The method of claim 80, wherein the overall thickness of said pickup assembly is less than about 25 thousandths of an inch.

84. The method of claim 80, wherein the overall thickness of said pickup assembly is less than 16 thousandths of an inch.

85. The method of claim 80, wherein the overall thickness of said pickup assembly is about 14 thousandths of an inch.

86. The method of claim 80, wherein the overall thickness of said pickup assembly is about 12 thousandths of an inch.

87. A stringed instrument comprising:

a plurality of strings;

an instrument saddle having a top portion contacting the strings and a bottom surface;

a flexible pickup circuit assembly having first and second portions, wherein said first portion is mounted flat in contact with the bottom surface of the saddle wherein the saddle couples the vibrating action of the strings to said assembly, the assembly comprising:

at least two flexible insulating substrate layers;

a flexible sensor for converting vibrations of the saddle into electric signals sandwiched between two of said flexible insulating substrate layers; and at least one lead electrically connected to said sensor, said lead for carrying the electrical signals from the sensor for electrical connection to an amplifier of the string instrument;

wherein said flexible pickup assembly is flexible so that the second portion of the assembly is bent out of the plane in which the first portion resides.

88. The stringed instrument of claim 87, wherein said flexible pickup assembly is in a form wherein the first portion of said pickup assembly is at an approximately ninety degree angle from the second portion of said pickup assembly.

89. The stringed instrument of claim 87, wherein said flexible pickup assembly is in a form having a substantially L-shaped configuration, with the first portion of the pickup assembly being one leg of the L and the second portion of the pickup assembly being the other leg of the L.

90. The stringed instrument of claim 87, wherein the overall thickness of said assembly is less than 100 thousandths of an inch.

91. A stringed instrument comprising:

a plurality of strings;

an instrument saddle having a top portion contacting the strings, and a bottom surface;

a flexible pickup circuit assembly having first and second portions, said first portion mounted under the saddle in contact with the bottom surface of the saddle wherein the saddle couples the vibrating action of the strings to the pickup assembly, said pickup assembly comprising:

a flexible strip of sensor material for converting vibrations of the saddle into electrical signals;

a first flexible insulating substrate on one side of the sensor strip;

a second flexible insulating substrate on the opposite side of the sensor strip from the first such substrate; and an electrical circuit comprising at least one electrical contact for picking up the electrical signals from the sensor strip and at least one electrically conductive lead line for carrying the electrical signals from such a contact for electrical connection to an amplifier;

wherein the electrical circuit, the sensor strip, and the flexible insulating substrates are all sandwiched together, and wherein the thickness of the assembly is less than 100 thousandths of an inch.

92. The stringed instrument of claim 91, wherein said at least one electrical contact is sandwiched between the first flexible insulating substrate and the sensor strip, and wherein the circuit further comprises a first ground sandwiched between the second flexible insulating substrate and the sensor strip.

93. The stringed instrument of claim 92, additionally comprising a second ground on the opposite side of the sensor strip from the first ground.

94. The stringed instrument of claim 91, wherein said flexible pickup assembly is in a form having a substantially L-shaped configuration, with the first portion of the assembly being one leg of the L and the second portion of the assembly being the other leg of the L.

95. A flexible pickup circuit assembly for mounting in a stringed instrument under an instrument saddle which couples the vibratory action of the strings to the pickup assembly, said pickup assembly comprising:

an elongated flexible sensor for converting vibrations of the saddle into electrical signals, said sensor strip having first and second surfaces;

an elongated flexible insulating substrate on one side of the sensor with a first surface of said insulating substrate facing the first surface of the sensor and a second surface of said insulating substrate facing away from said sensor; and at least one electrical contact area sandwiched between the sensor and the first surface of said insulating substrate, wherein a lead is connected electrically to the electrical contact area for carrying electrical signals from the sensor for electrical connection to an amplifier of the stringed instrument;

wherein said flexible pickup assembly comprises a first portion configured to underlie the saddle and extend in a horizontal plane parallel to the plane of the instrument strings and a second portion which is bendable out of the horizontal plane in which the first portion lies.

96. The flexible pickup circuit assembly of claim 95, wherein said flexible pickup assembly is flexible so that the pickup assembly can be bent into a form wherein the first portion of said pickup assembly is at an approximately ninety degree angle from the second portion of said pickup assembly.

97. The flexible pickup circuit assembly of claim 95, wherein said flexible pickup assembly is flexible so that the pickup assembly can be bent into a form having a substantially L-shaped configuration, with the first portion of the pickup assembly being one leg of the L and the second portion of the pickup assembly being the other leg of the L.

98. The flexible pickup circuit assembly of claim 95, wherein the overall thickness of said assembly is less than 100 thousandths of an inch.

99. The flexible pickup circuit assembly of claim 95, wherein the overall thickness of said assembly is less than 25 thousandths of an inch.

100. The flexible pickup circuit assembly of claim 95, wherein the overall thickness of said assembly is about 14 thousandths of an inch.

101. The flexible pickup circuit assembly of claim 95, wherein the overall thickness of said assembly is about 12 thousandths of an inch.

102. The flexible pickup circuit assembly of claim 95, wherein said assembly has torsional flexibility.

103. The flexible pickup circuit assembly of claim 95, wherein a ground is on the second surface of the sensor.

104. A flexible pickup circuit assembly for mounting in a stringed instrument under an instrument saddle which couples the vibratory action of the strings to the pickup assembly, said pickup assembly comprising:

a flexible strip of sensor material for converting vibrations of the saddle into electrical signals, said sensor strip having first and second surfaces;

a flexible insulating substrate on one side of the sensor strip, with a first surface of said insulating substrate facing the first surface of the sensor strip; and an electrical circuit comprising at least one electrical contact for picking up the electrical signals from the sensor strip and at least one electrically conductive lead line for carrying the electrical signals from such a contact for electrical connection to an amplifier;

wherein the electrical contact is between the sensor strip and the insulating substrate, and wherein the thickness of the assembly is less than about 100 thousandths of an inch.

105. The flexible pickup circuit assembly of claim 104, wherein the circuit further comprises a ground on the second surface of the sensor strip.

106. The flexible pickup circuit assembly of claim 104, wherein said flexible pickup assembly comprises a first portion configured to be mounted in said stringed instrument under the instrument saddle in a horizontal plane substantially parallel to the plane of the instrument top, said assembly being flexible so that the assembly can be bent into a form wherein a second portion of the assembly is bendable out of the horizontal plane.

107. The flexible pickup circuit assembly of claim 106, wherein said flexible pickup assembly is flexible so that the assembly can be bent into a form having a substantially L-shaped configuration, with the first portion of the assembly being one leg of the L and the second portion of the assembly being the other leg of the L.

108. The flexible pickup circuit assembly of claim 106, wherein the assembly is flexible so that the assembly can be bent into a form where the first portion is at an approximately 90 degree angle from the second portion of said assembly.

109. The flexible pickup circuit assembly of claim 104, wherein the overall thickness of said assembly is less than 25 thousandths of an inch.

110. The flexible pickup circuit assembly of claim 104, wherein said assembly has torsional flexibility.

111. A method of manufacturing an undersaddle pickup of any selected width suitable for any given saddle width, the method comprising the steps of:

forming a pickup assembly having an overall thickness of less than 100 thousandths of an inch, said assembly comprising at least one flexible insulating substrate and a sensor sandwiched together and having circuit elements printed either on the insulating substrate or the sensor for forming a circuit for sensing an electrical signal at the sensor in response to vibrations of a saddle being transferred to the sensor; and cutting the pickup assembly on either side of the circuit elements to form a pickup of a selected width suitable for a given saddle width, whereby when the pickup is installed under the saddle, the saddle will contact a surface of the pickup along the length of said pickup.

112. A method according to claim 111, wherein in the step of forming, there are circuit elements for forming multiple circuits side by side on the flexible substrate and the sensor, and wherein in the step of cutting, the substrates and sensor are cut between the circuits so as to form a plurality of pickups of selected widths.

113. The method of claim 111, wherein the overall thickness of said pickup assembly is less than 25 thousandths of an inch.

114. The method of claim 111, wherein the overall thickness of said pickup assembly is less than 16 thousandths of an inch.

115. The method of claim 111, wherein the overall thickness of said pickup assembly is less than 14 thousandths of an inch.

116. The method of claim 111, wherein the overall thickness of said pickup assembly is 12 thousandths of an inch.

117. A stringed instrument comprising:

a plurality of strings;

an instrument saddle having a top portion contacting the strings and a bottom surface;

a flexible pickup circuit assembly having first and second portions, wherein said first portion is mounted flat in contact with the bottom surface of the saddle wherein the saddle couples the vibrating action of the strings to said assembly, the assembly comprising:

a flexible sensor for converting vibrations of the saddle into electrical signals, said sensor having first and second surfaces;

an elongated insulating substrate on one side of the sensor with a first surface of said insulating substrate facing the first surface of the sensor strip and a second surface of said insulating substrate facing away from the sensor; and at least one electrical contact area sandwiched between the first surface of the sensor and the first surface of the insulating substrate, wherein a lead is connected electrically to the electrical contact area for carrying electrical signals from the sensor for electrical connection to an amplifier of the stringed instrument;

wherein said flexible pickup assembly is flexible so that the second portion of the assembly is bent out of the plane in which the first portion resides.

118. The stringed instrument of claim 117, wherein said flexible pickup circuit assembly is in a form wherein the first portion of said pickup assembly is at an approximately ninety degree angle from the second portion of said pickup assembly.

119. The stringed instrument of claim 117, wherein said flexible pickup circuit assembly is in a form having a substantially L-shaped configuration, with the first portion of the pickup assembly being one leg of the L and the second portion of the pickup assembly being the other leg of the L.

120. The stringed instrument of claim 117, wherein the overall thickness of said assembly is less than 100 thousandths of an inch.

121. The stringed instrument of claim 117, wherein a ground is on the second surface of the sensor strip.

122. A stringed instrument comprising:

a plurality of strings;

an instrument saddle having a top portion contacting the strings; and a bottom surface;

a flexible pickup circuit assembly having first and second portions, said first portion mounted under the saddle in contact with the bottom surface of the saddle wherein the saddle couples the vibrating action of the strings to the pickup assembly, said pickup assembly comprising:

a flexible strip of sensor material for converting vibrations of the saddle into electrical signals, said sensor strip having first and second surfaces;

a flexible insulating substrate on one side of the sensor strip, with a first surface of said insulating substrate facing the first surface of the sensor strip; and an electrical circuit comprising at least one electrical contact for picking up the electrical signals from the sensor strip and at least one electrically conductive lead line for carrying the electrical signals from such a contact for electrical connection to an amplifier;

wherein the electrical contact is between the first surface of the sensor strip and the first surface of the insulating substrate, and wherein the thickness of the assembly is less than 100 thousandths of an inch.

123. The stringed instrument of claim 122, wherein the circuit further comprises a ground on the second surface of the sensor strip.

124. The stringed instrument of claim 122, wherein said flexible pickup assembly is in a form having a substantially L-shaped configuration, with the first portion of the assembly being one leg of the L and the second portion of the assembly being the other leg of the L.

* * * * *

UNITED STATES PATENT AND TRADEMARK OFFICE

CERTIFICATE OF CORRECTION

PATENT NO. : 6,023,019
DATED : February 8, 2000
INVENTOR(S) : Lloyd R. Baggs

It is certified that error appears in the above-identified patent and that said Letters Patent is hereby corrected as shown below:

Column 13,
Line 10, after "horizontal plane" insert -- substantially --.
Line 11, after "assembly being" delete "sufficiently".

Column 14,
Line 55, after "substrate on the" delete -- on --.

Column 16,
Line 6, replace " The method of" with -- The method according to --.

Column 18,
Line 67, replace "contract" with -- contact --.

Column 19,
Line 3, replace "contract" with -- contact --.

Column 20,
Line 8, after "is less than" delete "about".

Signed and Sealed this

Fifteenth Day of January, 2002

*Attest:*

JAMES E. ROGAN
*Director of the United States Patent and Trademark Office*

*Attesting Officer*